United States Patent
Saito et al.

(10) Patent No.: US 11,169,364 B2
(45) Date of Patent: Nov. 9, 2021

(54) IMAGE-PICKUP OPTICAL SYSTEM AND IMAGE PICKUP APPARATUS

(71) Applicant: SONY CORPORATION, Tokyo (JP)

(72) Inventors: Masahiro Saito, Kanagawa (JP); Hidetoshi Kabasawa, Saitama (JP)

(73) Assignee: SONY CORPORATION, Tokyo (JP)

( * ) Notice: Subject to any disclaimer, the term of this patent is extended or adjusted under 35 U.S.C. 154(b) by 205 days.

(21) Appl. No.: 16/249,380

(22) Filed: Jan. 16, 2019

(65) Prior Publication Data

US 2019/0219799 A1    Jul. 18, 2019

Related U.S. Application Data

(63) Continuation of application No. 14/399,045, filed as application No. PCT/JP2013/002515 on Apr. 12, 2013, now Pat. No. 10,215,970.

(30) Foreign Application Priority Data

May 16, 2012    (JP) .................................. 2012-112423

(51) Int. Cl.
  *G02B 13/14*    (2006.01)
  *G02B 13/00*    (2006.01)
  (Continued)

(52) U.S. Cl.
  CPC ............ *G02B 13/14* (2013.01); *G02B 3/0087* (2013.01); *G02B 13/003* (2013.01); *H04N 5/142* (2013.01); *G02B 1/002* (2013.01)

(58) Field of Classification Search
  CPC ...... G02B 13/003; G02B 13/14; G02B 1/002; G02B 3/0087; H04N 5/142
  See application file for complete search history.

(56) References Cited

U.S. PATENT DOCUMENTS 5,999,327 A * 12/1999 Nagaoka .............. G02B 3/0087
                                                            359/654
6,130,787 A * 10/2000 Tsuchida .............. G02B 3/0087
                                                            359/654

(Continued)

FOREIGN PATENT DOCUMENTS

DE    112008001232 T5    4/2010
EP          1077386 A1    2/2001

(Continued)

OTHER PUBLICATIONS

Notice of Allowance and Fees Due for U.S. Appl. No. 14/399,045, dated Oct. 10, 2018, 9 pages.

(Continued)

*Primary Examiner* — Joseph P Martinez
*Assistant Examiner* — Vipin Patel
(74) *Attorney, Agent, or Firm* — Chip Law Group

(57) ABSTRACT

An image-pickup optical system includes: a first lens provided near an aperture stop and configured to correct aberration; and a second lens arranged between the first lens and an image sensor and configured to collect light, the first lens being a gradient index lens. The degree of freedom of design of a gradient index lens is higher than that of a lens having a constant refractive index, and a gradient index lens thus has a high potential as a device for a lens. Because such a gradient index lens is employed, it is possible to correct aberration without performing expensive processing such as polishing for example. In other words, as a result, costs may be reduced and image-forming properties may not be reduced at the same time.

15 Claims, 24 Drawing Sheets

(51) Int. Cl.
*G02B 3/00* (2006.01)
*H04N 5/14* (2006.01)
*G02B 1/00* (2006.01)

(56) References Cited

U.S. PATENT DOCUMENTS

| | | | |
|---|---|---|---|
| 6,535,332 B1 | 3/2003 | Nakano et al. | |
| 7,724,180 B2 | 5/2010 | Yonak et al. | |
| 7,864,394 B1 * | 1/2011 | Rule | H01Q 15/0086 359/244 |
| 8,339,717 B2 | 12/2012 | Li | |
| 2003/0210341 A1 * | 11/2003 | Isono | G02B 9/12 348/335 |
| 2005/0007675 A1 * | 1/2005 | Matsumoto | G02B 3/0087 359/652 |
| 2008/0272955 A1 | 11/2008 | Yonak et al. | |
| 2011/0204891 A1 * | 8/2011 | Drake | G01R 33/36 324/309 |

FOREIGN PATENT DOCUMENTS

| | | |
|---|---|---|
| JP | 08-286133 A | 11/1996 |
| JP | 2004-258310 A | 9/2004 |
| JP | 2008-507733 A | 3/2008 |
| JP | 2010-526318 A | 7/2010 |
| JP | 2010-527565 A | 8/2010 |
| JP | 2011-082324 A | 4/2011 |
| JP | 2011-158665 A | 8/2011 |
| WO | 00/2511 A1 | 9/2000 |
| WO | 2008/137509 A1 | 11/2008 |

OTHER PUBLICATIONS

Advisory Action for U.S. Appl. No. 14/399,045, dated Aug. 9, 2018, 3 pages.
Final Rejection for U.S. Appl. No. 14/399,045, dated Jun. 1, 2018, 17 pages.
Non-Final Rejection for U.S. Appl. No. 14/399,045, dated Oct. 5, 2017, 16 pages.
Final Rejection for U.S. Appl. No. 14/399,045, dated May 4, 2017, 14 pages.
Non-Final Rejection for U.S. Appl. No. 14/399,045, dated Oct. 5, 2016, 13 pages.
Advisory Action for U.S. Appl. No. 14/399,045, dated Aug. 8, 2016, 3 pages.
Final Rejection for U.S. Appl. No. 14/399,045, dated May 20, 2016, 13 pages.
Non-Final Rejection for U.S. Appl. No. 14/399,045, dated Nov. 9, 2015, 13 pages.
International Search Report and Written Opinion of PCT Application No. PCT/JP2013/002515, dated Jul. 16, 2013, 13 pages of English Translation and 12 pages of ISRWO.
International Preliminary Report on Patentability of PCT Application No. PCT/JP2013/002515, dated Nov. 27, 2014, 12 pages of English Translation and 8 pages of IPRP.

* cited by examiner

Example 1

Example 2

Example 3

Example 4

Example 5

IMAGE-PICKUP OPTICAL SYSTEM AND IMAGE PICKUP APPARATUS

CROSS REFERENCE PARAGRAPH

The present application is a continuation application of U.S. patent application Ser. No. 14/399,045, filed Nov. 5, 2014, which is a National Stage Entry of PCT/JP2013/002515, filed Apr. 12, 2013, and claims the benefit of priority from prior Japanese Patent Application JP 2012-112423, filed May 16, 2012, the entire content of which is hereby incorporated by reference. Each of the above-referenced applications is hereby incorporated herein by reference in its entirety.

TECHNICAL FIELD

The present technology relates to an image-pickup optical system configured to form images to detect images, and an image pickup apparatus employing the image-pickup optical system.

BACKGROUND ART

Image-pickup optical systems, which are used not only for the visible-light range but also for the infrared-frequency range or the terahertz-frequency range, have been developed as image-pickup optical systems configured to detect images.

For example, an infrared image-pickup optical system uses heat from an object such as a person or an animal, i.e., far-infrared (wavelength 8 μm to 12 μm), and is used to pick up an image in a dark place, to observe a temperature distribution, or the like.

Moreover, an image-pickup optical system for the terahertz wave (wavelength 30 μm to 3 mm: 100 GHz to 10 THz) is used for so-called non-destructive tests such as for example security checks at airport facilities.

Patent Document 1: Japanese Patent Application Laid-open No. 2010-526318
Patent Document 2: Japanese Patent Application Laid-open No. 2011-82324
Patent Document 3: Japanese Patent Application Laid-open No. 2010-527565
Patent Document 4: Japanese Patent Application Laid-open No. 2008-507733

SUMMARY OF INVENTION

Problem to be Solved by the Invention

Here, it is desirable that the above-mentioned image-pickup optical systems configured to pick up infrared images or terahertz-wave images should be high-resolution in order to pick up clear images.

It is desirable to reduce various kinds of optical aberration to make resolution high.

However, few lens materials may be used from the viewpoints of transmittance and the like for the infrared wavelength range and the terahertz-wave wavelength range, and it is difficult to process such lens materials, which are problematic.

For example, germanium and the like are known as materials having relatively high infrared transmittance. However, those lens materials having high infrared transmittance are relatively high in hardness, and it is difficult to process those lens materials.

It is difficult to reduce costs because for example it takes a long time to process them. Specifically if an aspheric shape is processed (polished) to correct aberration, it is necessary to use a precision equipment and to process it for a long time, which results in unavoidable high costs.

The present technology has been made in view of the above-mentioned problems. It is an object of the present technology to reduce costs of an image-pickup optical system, which forms images to especially pick up infrared images or terahertz-wave images, and to prevent image-forming properties from being decreased at the same time.

Means for Solving the Problem

According to the present technology, an image-pickup optical system is structured as follows to solve the above-mentioned problems.

In other words, an image-pickup optical system according to the present technology includes a first lens provided near an aperture stop and configured to correct aberration.

The image-pickup optical system further includes a second lens arranged between the first lens and an image sensor and configured to collect light.

Moreover, the first lens is a gradient index lens.

Moreover, according to the present technology, an image pickup apparatus is structured as follows.

In other words, an image pickup apparatus according to the present technology includes the image-pickup optical system of the present technology; an image detector configured to detect an image formed by the image-pickup optical system; and an image-signal obtaining unit configured to obtain an imaging signal based on a detection signal from the image detector.

Here, the degree of freedom of design of a gradient index lens is higher than that of a lens having a constant refractive index, and a gradient index lens thus has a high potential as a device for a lens. According to the present technology employing such a gradient index lens, it is possible to correct aberration without performing expensive processing such as polishing for example. In other words, as a result, costs may be reduced and image-forming properties may not be reduced at the same time.

Effect of the Invention

According to the present technology, costs of an image-pickup optical system configured to form images to pick up images, i.e., specifically, an infrared or terahertz-wave image-pickup optical system, may be reduced, and image-forming properties may not be reduced at the same time.

MODES FOR CARRYING OUT THE INVENTION

Hereinafter, embodiments of the present technology will be described.
Note that description will be made in the following order.
<1. Image pickup apparatus and image-pickup optical system of embodiment>
[1-1. Structure of image pickup apparatus]
[1-2. Outline of image-pickup optical system of embodiment]
<2. Specific examples>
[2-1. Example 1]
[2-2. Example 2]
[2-3. Example 3]
[2-4. Example 4]
[2-5. Example 5]
<3. Modification examples>

1. Image Pickup Apparatus and Image-Pickup Optical System of Embodiment 1-1. Structure of Image Pickup Apparatus FIG. 1 is a block diagram showing the internal structure of an image pickup apparatus 1 of an embodiment.

Firstly, it is presupposed that the image pickup apparatus 1 of this embodiment is an infrared image pickup apparatus configured to pick up infrared images.

Figure 1:
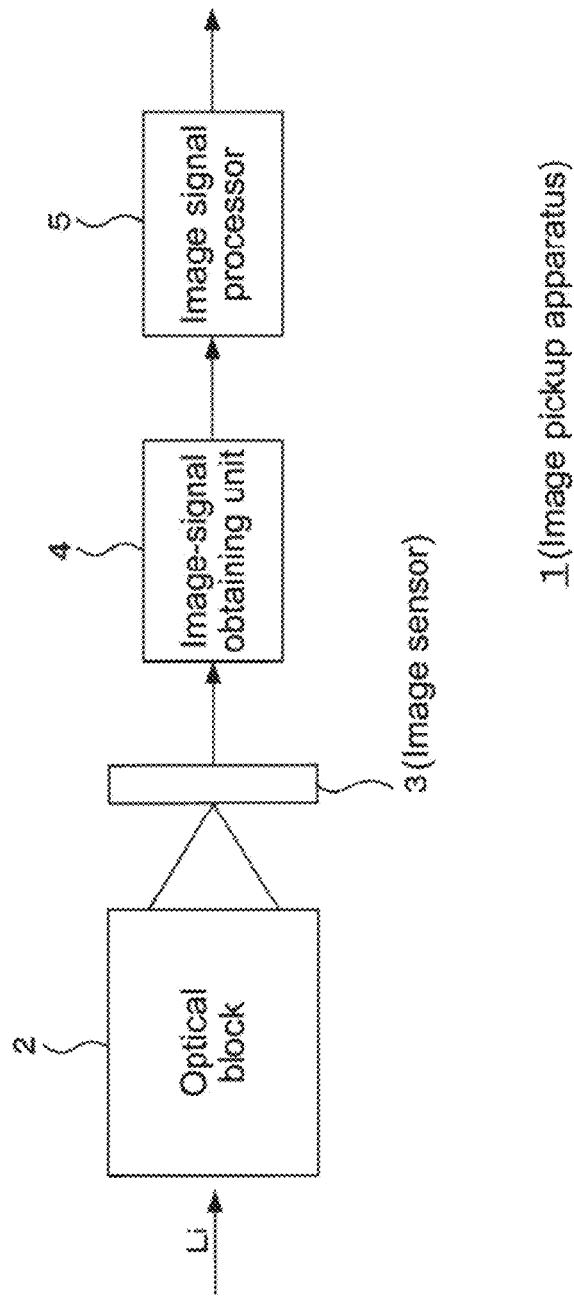
FIG. 1 A block diagram showing the internal structure of an image pickup apparatus of an embodiment.

As shown in FIG. 1, the image pickup apparatus 1 includes an optical block 2, an image sensor (imager) 3, an image-signal obtaining unit 4, and an image signal processor 5.

The optical block 2 inclusively shows a below-mentioned image-pickup optical system of the embodiment. The optical block 2 collects infrared light (infrared) from an object-of-imaging (object), which is denoted by incident light Li in the figure, on an imaging plane (image plane) of the image sensor 3.

The image sensor 3 detects the infrared collected by the optical block 2, and obtains infrared detection signals depending on the above-mentioned infrared from the object-of-imaging.

An example of infrared detection devices of the image sensor 3, which are configured to obtain infrared detection signals, are devices including pyroelectric devices. Alternatively, thermopile infrared detection devices, to which thermocouples generating Seebeck effect are connected, bolometric infrared detection devices, which utilize change in resistance values resulting from increase in temperature, or the like may be used.

Note that the infrared detection devices are not limited to them, and any kind of infrared detection devices may be used as long as it is possible to detect infrared.

Note that, if pyroelectric devices are used as infrared detection devices, a shutter is provided to periodically block infrared light, which enters the image sensor 3. This is to support the fact that a pyroelectric device is not a device which outputs values corresponding to temperature per se but a device which outputs values corresponding to temperature differences (temperature changes). In other words, the above-mentioned shutter periodically generates the irradiation status/blocked status of infrared light, and temperature difference is thus generated purposefully. As a result, an image (infrared-taken image) having an appropriate temperature distribution of a static object may be obtained.

The image-signal obtaining unit 4 inputs infrared detection signals (detection signals obtained by the above-mentioned infrared detection devices) obtained by the image sensor 3, and obtains infrared-imaging signals.

The image signal processor 5 performs various kinds of image-signal processing on the imaging signals obtained by the image-signal obtaining unit 4. For example, black level correction, pixel defect compensation, aberration correction, optical shading correction, lens distortion correction, temperature adjustment, calculation of an amount of distance change, coding, and the like are performed.

Output from the image signal processor 5 is sent to an external display (image display apparatus) or the like of the image pickup apparatus via a not-shown interface and the like.

1-2. Outline of Image-Pickup Optical System of Embodiment

Figure 2:
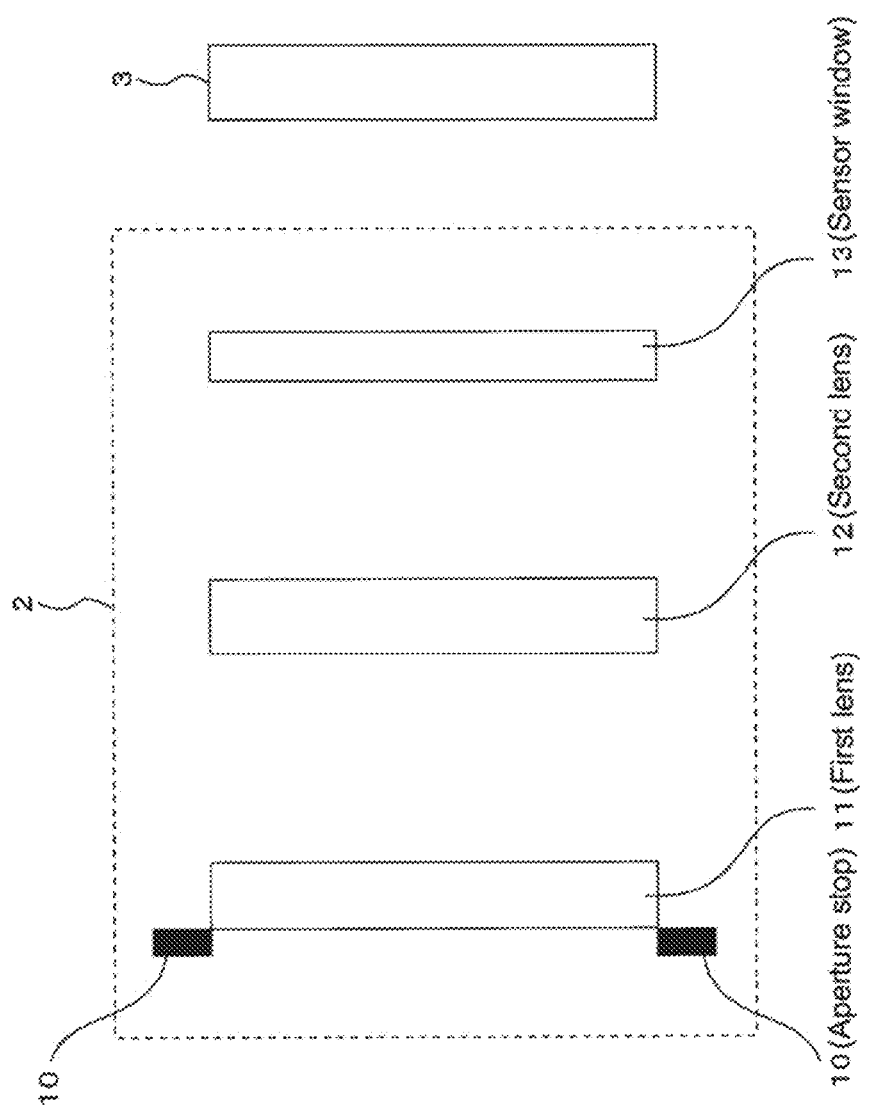
FIG. 2 A diagram illustrating the outline of the structure of the image-pickup optical system of the embodiment.

FIG. 2 is a diagram illustrating the outline of the structure of the image-pickup optical system of the optical block 2 of the embodiment.

In FIG. 2 and in addition the below-mentioned structure diagrams (FIGS. 8, 11, 14, 19, and 22) of the optical system, it is assumed that an imaging-target object is arranged at the left side of the sheet. In other words, the left side of the sheet is the object side, and the right side of the sheet is the image plane side.

Note that FIG. 2 shows the structure of the image-pickup optical system and in addition the above-mentioned image sensor 3 of FIG. 1.

As shown in the figure, in the image-pickup optical system of the embodiment, an aperture stop 10, a first lens 11, a second lens 12, and a sensor window 13 are arranged from the object side to the image plane side.

The first lens 11 is a lens configured to correct aberration, and is provided in the vicinity of the aperture stop 10. Because the first lens 10 is arranged in the vicinity of the aperture stop 10 as described above, spherical-aberration correction effect is increased.

Further, the second lens 12 functions as a collective lens configured to collect infrared light passing through the first lens 11. In other words, the second lens 12 functions as an imaging lens, which forms an infrared image on an imaging plane of the image sensor 3.

The sensor window 13 has, for example, a flat plate shape, and is provided to protect the imaging plane of the image sensor 3.

Here, in the image-pickup optical system of this embodiment, at least the first lens 11 is a gradient index lens (so-called GRIN lens).

The degree of freedom of design of a GRIN lens is higher than that of a lens having a constant refractive index, and a GRIN lens thus has a high potential as a device for a lens.

Because such a GRIN lens is used as the first lens 11, it is not necessary to perform expensive processing for aberration correction as in the past, and the costs may be reduced from this viewpoint.

Moreover, in the image-pickup optical system of this embodiment, the focal distance $f_2$ of the second lens 12 is approximately the same as the focal distance $f$ of the entire image-pickup optical system including the second lens 12.

Specifically, for example the image-pickup optical system is designed such that the following condition is satisfied.

$$0.9 \leq \frac{f_2}{f} \leq 1.1 \qquad \text{[Math. 1]}$$

The fact that the focal distance $f_2$ of the second lens 12 is approximately the same as the focal distance $f$ of the entire image-pickup optical system means that the second lens 12 has almost all of the light-collection function of the optical system, and it is not necessary for the first lens 11 side to have a light-collection function. In other words, because of this, it is possible to design the first lens 11 as a lens specialized in aberration correction, and as a result it is possible to increase an aberration-correction effect.

Moreover, in this embodiment, the refractive index distribution (hereinafter referred to as refractive index distribution $N_1$) of the first lens 11 being a GRIN lens is designed such that second order differential in its radius direction increases monotonically.

Here, the refractive index distribution N of the GRIN lens is as follows.

$$N = N_0 + nr_{12} \cdot R^2 + nr_{14} \cdot R^4 + nr_{16} \cdot R^6 + nz_{11} \cdot Z + nz_{12} \cdot Z^2 + nz_{13} \cdot Z^3 \qquad \text{[Math. 2]}$$

where $N_0$ is a standard refractive index of a GRIN lens, R is the position of the lens in the radius direction (center of optical axis of incident plane is 0), and Z is the position of the lens in the optical-axis direction (center of optical axis of incident plane is 0) in [Math. 2]. Moreover, $nr_{ij}$ is a coefficient of the term Rj, and $nz_{ij}$ is a coefficient of the term $Z_j$.

Note that, here, for simplicity, the sextuplicate term R and the lower and the cubed term Z and the lower are shown, but the same applies to higher-order terms. With regard to the refractive index distribution N of a GRIN lens represented by the above-mentioned [Math. 2], the refractive index distribution in the radius direction (r) will be referred to as "N(r)".

The first lens 11 of this embodiment is designed such that second order differential of the refractive index distribution N(r) in the radius direction $$\frac{\partial^2 N}{\partial R^2} \qquad \text{[Math. 3]}$$

increases monotonically.

Hereinafter, the refractive index distribution N(r) of the first lens 11 in the radius direction will be referred to as "$N_1(r)$".

Moreover, second order differential of the refractive index distribution $N_1(r)$ of the first lens 11 in the radius direction is represented by the following mathematical formula.

$$\frac{\partial^2 N_1}{\partial R^2} \qquad \text{[Math. 4]}$$

Because the refractive index distribution $N_1(r)$ is prepared such that second order differential in the radius direction increases monotonically as described above, a spherical-aberration-correction effect of the first lens 11 is obtained. Here, FIGS. 3A and 3B show an example of a refractive index distribution pattern in the radius direction to be prepared in order to correct spherical aberration.

Figures 3A, 3B:
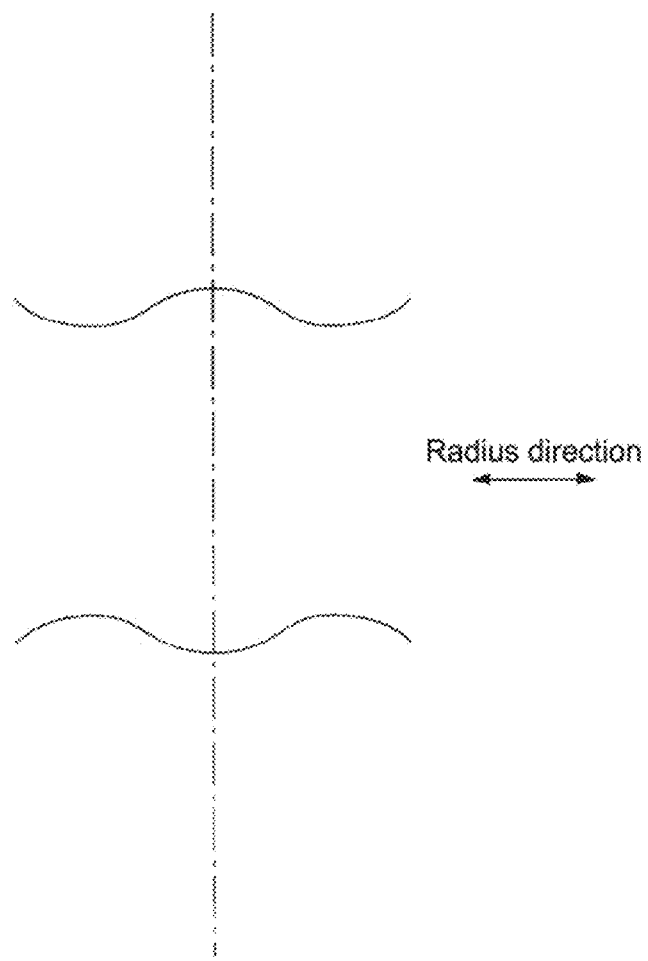
FIGS. 3A and 3B The diagrams showing an example of a refractive index distribution pattern in the radius direction to be prepared in order to correct spherical aberration.

The refractive index distribution N(r) of FIG. 3A or FIG. 3B is prepared to obtain a spherical-aberration-correction effect.

It is understood that second order differential of the refractive index distribution N(r) of either FIG. 3A or FIG. 3B in the radius direction increases monotonically.

It means that, the first lens 11, of which second order differential of the refractive index distribution $N_1(r)$ in the radius direction increases monotonically, obtains a spherical-aberration-correction effect.

Here, in this embodiment, not only the first lens 11 is a gradient index lens, but also the second lens 12 is a gradient index lens.

As a result, degree of freedom of design of the second lens 12 per se and degree of freedom of design of the entire optical system may be increased.

Moreover, in this embodiment, one of the first lens 11 and the second lens 12 has refractive index distribution also in the optical-axis direction.

Because of refractive index distribution in the optical-axis direction, degree of freedom of optical design may be further increased.

Here, a below-mentioned example proposes a structure in which both the first lens 11 and the second lens 12 have refractive index distributions also in the optical-axis direction (Example 3).

If both the first lens 11 and the second lens 12 have refractive index distributions also in the optical-axis direction, the relation of second order differential of the refractive index distribution $N_1$ of the first lens 11 in the optical-axis direction (Z) and second order differential of the refractive index distribution (hereinafter referred to as refractive index distribution $N_2$) of the second lens 12 in the optical-axis direction is positive/negative. As a result, MTF (Modulation Transfer Function) is improved in a wide angle of view. In other words, resolution performance is increased.

Here, an example of a condition of the above-mentioned "the relation of second order differential of the refractive index distribution $N_1$ of the first lens 11 in the optical-axis direction and second order differential of the refractive index distribution $N_2$ of the second lens 12 in the optical-axis direction is positive/negative" is for example the condition of the following [Math. 5].

$$\left.\frac{\partial^2 N_1}{\partial Z^2}\right|_{z=t_1/2} \geq 0 \qquad [\text{Math. 5}]$$

and $$\left.\frac{\partial^2 N_2}{\partial Z^2}\right|_{z=t_2/2} \leq 0$$

where "$N_1(r,z)$" means the refractive index distribution (radius direction and optical-axis direction) of the first lens 11, and "$N_2(r,z)$" means the refractive index distribution (radius direction and optical-axis direction) of the second lens 12 in [Math. 5]. Moreover, $t_1$ and $t_2$ mean the center thickness of the first lens 11 and the center thickness of the second lens 12, respectively.

If the above-mentioned condition "the relation of second order differential of the refractive index distribution $N_1$ of the first lens 11 in the optical-axis direction and second order differential of the refractive index distribution $N_2$ of the second lens 12 in the optical-axis direction is positive/negative" is satisfied, then it means that aberration correction at the first lens 11 side and aberration correction at the second lens 12 side are well-balanced. As a result, it is possible to increase an effect of correcting peripheral aberration, and resolution may be increased in a wide angle of view.

Moreover, in this embodiment, a so-called metamaterial lens may be used as a GRIN lens.

Here, a metamaterial is an artificial structure including unit cells, each of which has a side shorter than the wavelength-in-use. The above-mentioned unit cell has an internal conductor, a dielectric material supports the conductor, and the metamaterial is thus structured.

Figure 4A:
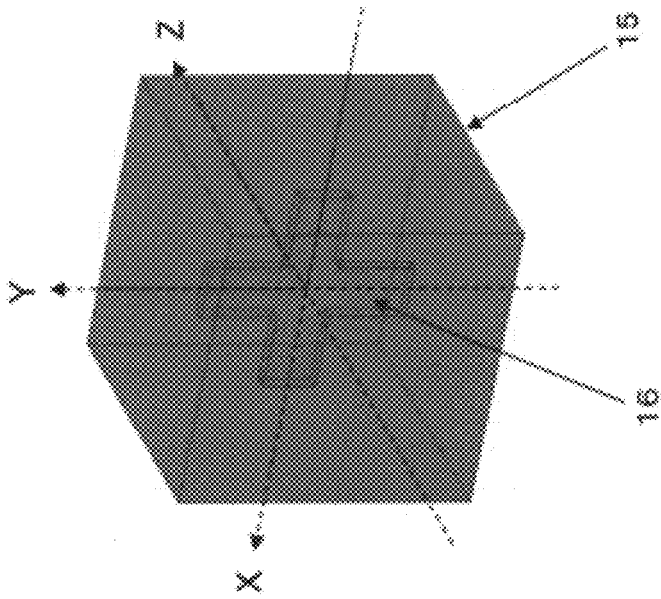
FIGS. 4A and 4B Each shows an example of the structure of a unit cell of a metamaterial.
Figure 4B:
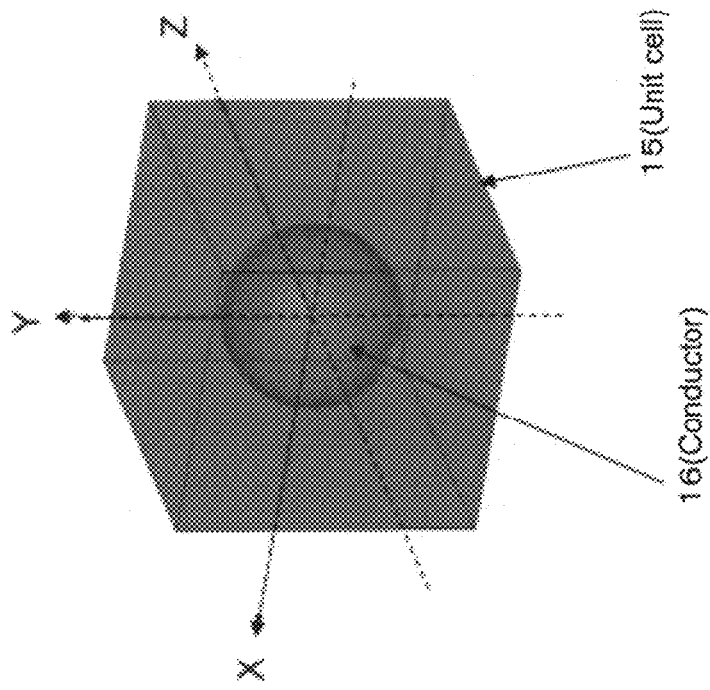

Each of FIGS. 4A and 4B shows an example of the structure of a unit cell 15 of a metamaterial.

Figure 5:
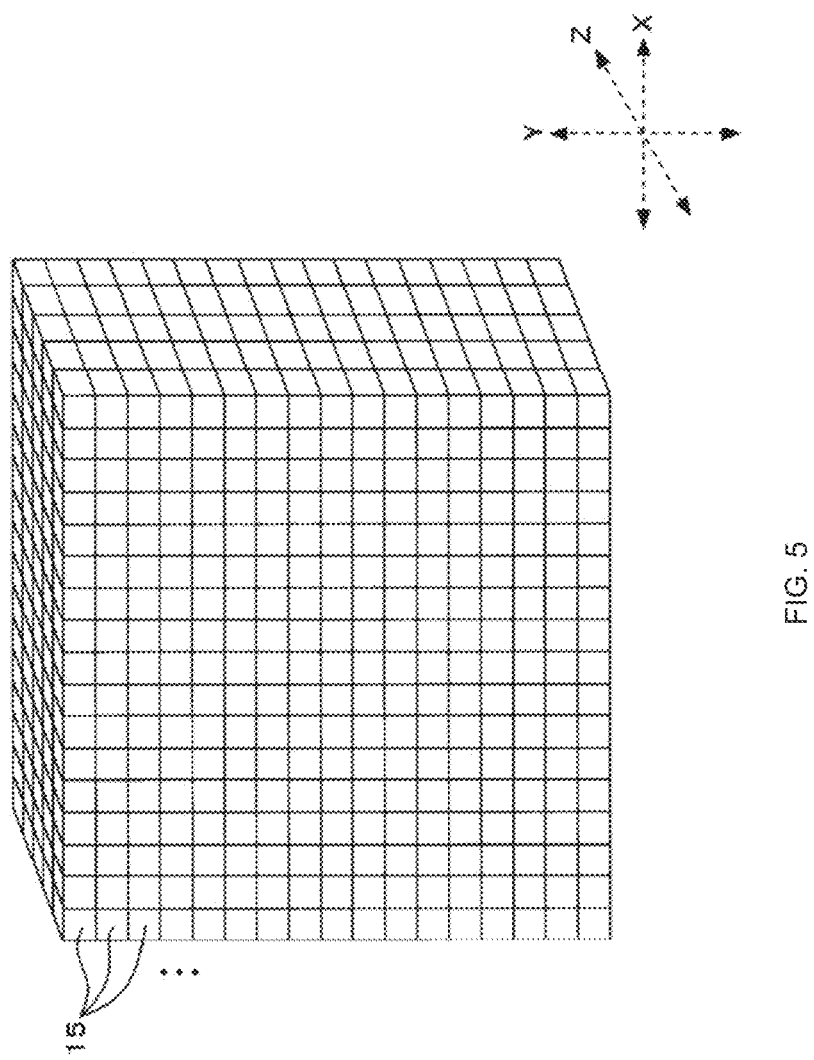
FIG. 5 A diagram showing the structure of a metamaterial.

As shown in FIG. 4A or FIG. 4B, the unit cell 15 has an internal conductor 16. A dielectric material supports the conductor 16, and the unit cell 15 is thus formed. As shown in FIG. 5, such unit cells 15 are stacked in the X, Y, and Z directions, and a metamaterial (metamaterial lens) is thus formed.

Here, a metamaterial controls the structure of the unit cell 15, and utilizes one of or both of electric resonance and magnetic resonance resulting from an incident wavelength. As a result, the metamaterial is capable of controlling electric permittivity and magnetic permeability of an electromagnetic wave having a wavelength-in-use.

As is known, the square root of the product of electric permittivity ($\varepsilon$) and magnetic permeability ($\mu$) is a refractive index.

Here, a GRIN lens in the past, which does not employ such a metamaterial, is manufactured by for example an ion-exchange method, a sol-gel method, or the like, i.e., by using an electromagnetic field when a material is being solved or is gel-like and by thus controlling the distribution of metal ions. However, it is difficult for such a GRIN lens in the past to form a complicated refractive index distribution. Because of this, it is difficult to obtain refractive index distribution corresponding to an effect of an aspheric shape.

Moreover, if a device has a refractive index distribution in the radius direction, the optical power of the device is determined based on the refractive index difference in the radius direction and based on the length in the optical-axis direction. It is difficult for a GRIN lens in the past to obtain a large refractive index difference. As a result, an enough optical power may be obtained only if a GRIN lens in the past has a smaller diameter and is long along the optical axis.

In other words, as a result, it may be difficult to apply a GRIN lens in the past to an image-pickup optical system, which requires relatively high brightness, such as the infrared image-pickup optical system exemplified in this embodiment.

In view of this point, in the below-mentioned examples, a metamaterial lens is used as a GRIN lens.

As described above, the square root of the product of electric permittivity and magnetic permeability is a refractive index of a metamaterial lens. In view of this, it is possible to generate a complicated refractive index distribution relatively easily by changing the structures of unit cells depending on positions.

As a result, it is possible to easily realize, by using a metamaterial lens, coexistence of refractive index distributions in the radius direction and in the optical-axis direction and a complicated refractive index distribution, which are difficult to realize by a known method of manufacturing a GRIN lens.

In other words, as a result, it is easy to design an image-pickup optical system having a high aberration correction ability and enabling high resolution.

Moreover, because a metamaterial lens is capable of easily realizing a large refractive index difference, it is easy to make lenses (especially second lens 12 for collecting light) thinner and make the lenses larger in diameter. As a result, it is advantageous to increase in brightness of the optical system.

Here, when a metamaterial lens is used, it is possible to control polarization properties by devising the structure of of the metamaterial lens.

For example, as previously shown in FIG. 4A, if the structure of the unit cell 15 has a structure symmetric with respect to three axes, i.e., the Z axis (optical-axis direction), the X axis, and the Y axis, the X axis and the Y axis being on a plane perpendicular to the Z axis, then the unit cell 15 has an isotropic refractive index. In other words, the unit cell 15 has the same refractive index with respect to incident electromagnetic waves having arbitrary polarization direction.

In general, electromagnetic waves having various polarization directions enter the image-pickup optical system. The structure of FIG. 4A is capable of equalizing refractive indexes with respect to those arbitrary polarization directions.

Alternatively, as shown in FIG. 4B, the structure symmetric with respect to only two axes, i.e., the X axis and the Y axis, may be employed. In this case, the refractive index $N_{X-Y}$ of an electromagnetic wave having polarization on the X-Y plane is different from the refractive index $N_Z$ of an electromagnetic wave having polarization in the Z axis direction.

At this time, an electromagnetic wave entering the X-Y plane perpendicularly, i.e., an electromagnetic wave having polarization parallel to the X-Y plane, has a refractive index $N_{X-Y}$. Meanwhile, a refractive index of an electromagnetic wave entering the X-Y plane not perpendicularly or an electromagnetic wave entering the X-Y plane perpendicularly but then refracted is determined based on a refractive index ellipsoid having $N_{X-Y}$ and $N_Z$ and based on a direction vector of the electromagnetic wave.

It means that different incident angles result in different refractive indexes even if an electromagnetic wave enters the same position of a lens. Especially when an image-pickup optical system having a large angle of view is designed, this may be one degree of freedom.

It is possible to manufacture a metamaterial lens by using a microfabrication technology.

For example, a conductor structure is etched on a printed board made of a dielectric material, whereby the unit cell 15 is structured. Alternatively, it may be manufactured by using a semiconductor process (lithography, vapor deposition, etching, etc.).

Moreover, there is proposed a method including arranging a conductor structure in a liquid/gel dielectric material and then curing the dielectric material. In this embodiment, a metamaterial lens is manufactured by using one of those methods, for example.

Figure 6B:
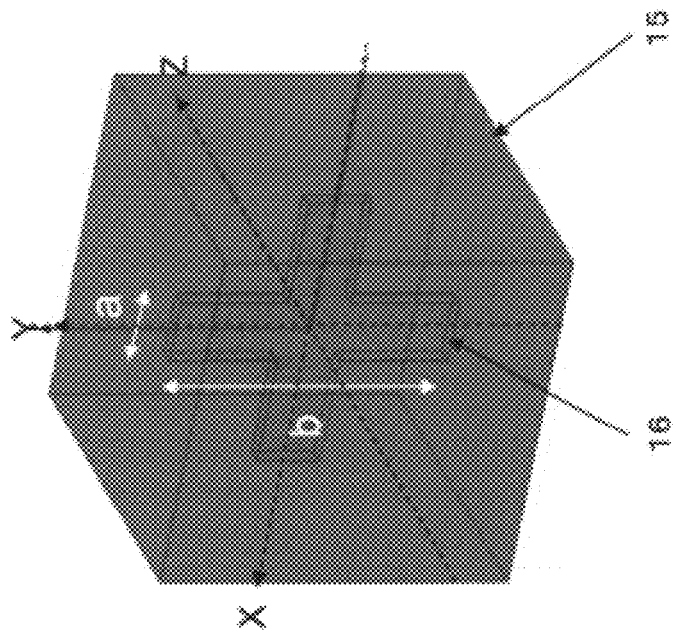
FIGS. 6A and 6B Diagrams showing a method of giving a refractive index distribution to a metamaterial lens.
Figure 6A:
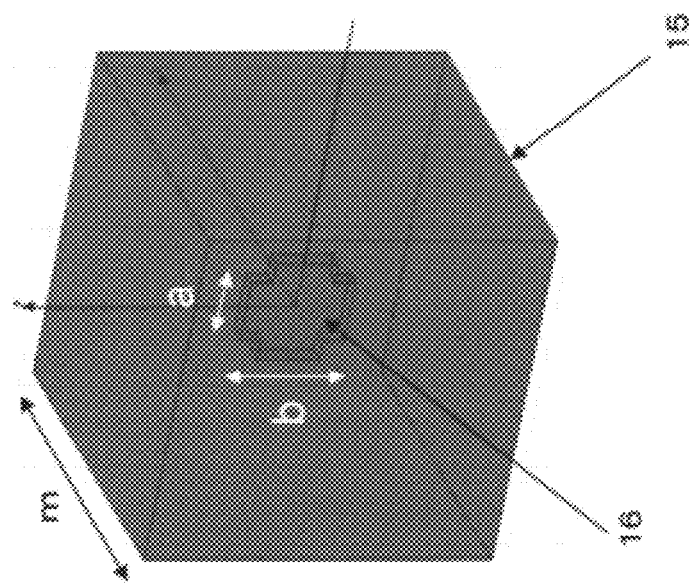

With reference to FIGS. 6A and 6B, a method of giving a refractive index distribution to a metamaterial lens will be specifically described.

In FIGS. 6A and 6B, firstly, it is presupposed that the unit cell 15 in this case is approximately cubic and that the length m of the side is about 1 μm.

In this case, the conductor 16 is Cu (copper), and a dielectric material supporting the conductor 16 is $BaF_2$ (barium fluoride).

As described above, $BaF_2$ supports the Cu structure in the unit cell 15, whereby it is possible to change a refractive index by changing the shape of Cu.

For example, in the example of those figures, the Cu structure has a cross-shaped structure.

The widths a of the four arms of the cross-shaped Cu are the same (for example a=180 nm). At this time, it is possible to adjust the refractive index depending on the length b of the cross-shaped arms by changing the length b as shown in FIG. 6A and FIG. 6B.

Figure 7:
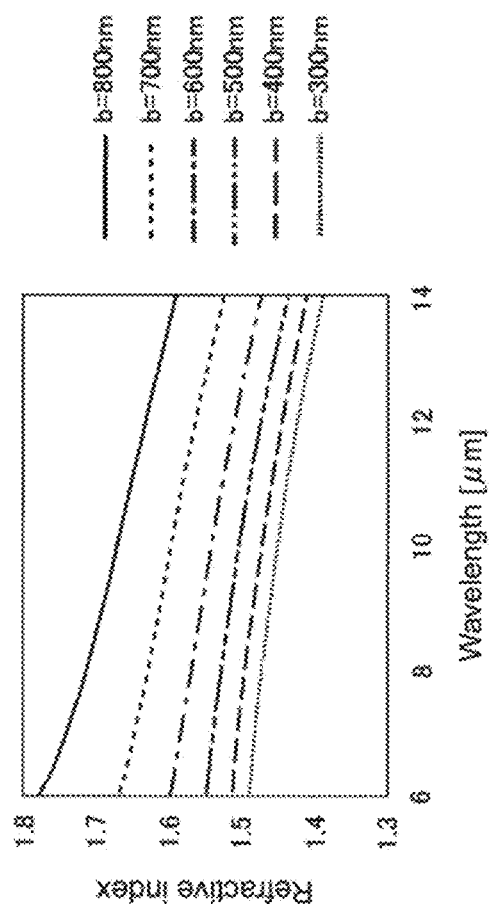
FIG. 7 A diagram showing measurement results of refractive indexes when the length of cross-shaped arms of a cross-shaped conductor is changed.

FIG. 7 shows measurement results of refractive indexes when the length b of the arms is changed.

Specifically, FIG. 7 shows change characteristics of refractive indexes with respect to wavelength (μm) when the length b of the arms is changed by 100 nm in the range of b=300 nm to 800 nm.

Also with reference to FIG. 7, it is understood that it is possible to adjust the refractive index depending on the length b of the arms.

It is possible for a metamaterial lens to have a refractive index distribution by combining the unit cells 15, each of which has a required refractive index depending on the shape of such a Cu plate (conductor 16), in the stacked product as previously shown in FIG. 5. Specifically, the unit cells 15 stacked in the radius direction is capable of obtaining a refractive index distribution N(r) in the radius direction, and the unit cells 15 stacked in the optical-axis direction is capable of obtaining a refractive index distribution N(z) in the optical-axis direction.

In the below-mentioned examples, a metamaterial lens having a required refractive index distribution is manufactured by using such a method.

Here, in this embodiment, a metamaterial lens may only be used as the first lens 11, or metamaterial lenses may be used as both the first lens 11 and the second lens 12. Especially if a metamaterial lens is used as the second lens 12, the second lens 12 may include a plurality of metamaterial lenses instead of one metamaterial lens.

As is understood from the above description, in this embodiment, because optical power is concentrated on the second lens 12 to form an image, the second lens 12 tends to be thick. If conductor structures and dielectric materials are stack to manufacture a metamaterial lens, the larger the thickness of a lens, the longer the manufacturing time.

In view of this, especially if the second lens 12 consists of a lens group including a plurality of metamaterial lenses, the manufacturing time may be reduced. In other words, because it is possible to make each one of metamaterial lenses thinner, it is possible to reduce the manufacturing time of each metamaterial lens. If the lenses are manufactured in parallel, it is possible to greatly reduce the manufacturing time of the second lens 12 compared to the second lens 12 consisting of one metamaterial lens.

Note that if a lens group including a plurality of metamaterial lenses is provided as described above, it is desirable that the thickness of each metamaterial lens should be 0.2 mm or more from the viewpoint of retention of strength.

Meanwhile, in recent years, a device using far-infrared is used as a temperature sensor or a motion sensor. However, the resolution of a temperature sensor or a motion sensor is low. A few kinds of devices such as thermo viewers and night vision systems include optical systems configured to form an image even of the shape of an object. In the future, it is desirable that optical systems should have wider angles of view in order to use such devices widely for various purposes. Specifically, an optical system, whose angle of view exceeds at least 25°, is desirable.

In the below-mentioned specific examples, optical systems are designed in view of this point.

Moreover, because far-infrared light and terahertz waves are low in energy, it is not possible to use an image sensor for visible light, and sensitivity of the image sensor 3 is relatively low. Because of this, it is desirable that F-number should be high to collect a larger amount of light, and it is desirable that F-number should be 1.8 or less, for example.

Moreover, for a purpose such as temperature distribution measurement, which requires resolution, it is desirable that F-number should be 1.3 or less in order to increase the amount of collected light and to increase resolution.

In the below-mentioned specific examples, optical systems are designed also in view of such requirement of F-number.

2. Specific Examples

2-1. Example 1

Figure 8:
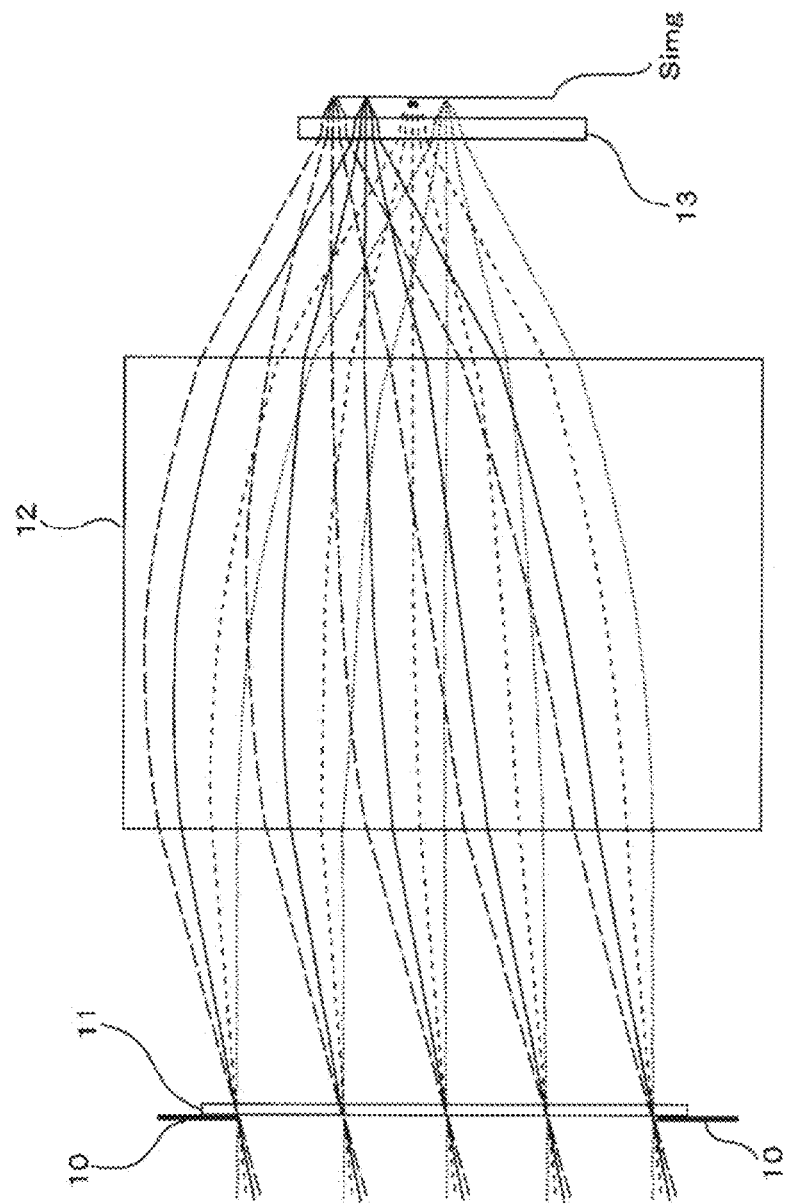
FIG. 8 A diagram showing the structure of an image-pickup optical system of Example 1.

FIG. 8 shows the structure of an image-pickup optical system of Example 1.

Note that, in FIG. 8, the plane Simg (hereinafter referred to as imaging plane Simg) in this figure shows the imaging plane of the image sensor 3 shown in FIG. 1 (and FIG. 2).

Moreover, FIG. 8 also shows infrared light beams (far-infrared light: central wavelength of 10 μm).

In this figure, light beams of the extremely-short-dashed lines show light beams collected at the image height 0.0 mm, and light beams of the short-dashed lines show light beams collected at the image height 1.5 mm. Further, light beams of the solid lines show light beams collected at the image height 3.5 mm, and light beams of the long-dashed lines show light beams collected at the image height 5.0 mm.

In this example, metamaterial lenses are used as both the first lens 11 and the second lens 12.

Moreover, in this example, both the first lens 11 and the second lens 12 have refractive index distributions only in the radius direction, and do not have refractive index distributions in the optical-axis direction.

Specifically, the coefficients of the first lens 11 and the second lens 12 set in this case are as follows.

First lens 11
$t_1$: 0.51 mm
$N_{10}=1.5$
$nr_{12}=-0.0045619$
$nr_{14}=2.6341\times10^{-5}$
$nr_{16}=3.9083\times10^{-5}$
$nz_{11}=0$
$nz_{12}=0$
$nz_{13}=0$
Second lens 12
$t_2$: 20.98 mm
$N_{20}=1.7$
$nr_{22}=-0.0014226$
$nr_{24}=1.5207\times10^{-7}$
$nr_{26}=-2.4759\times10^{-10}$
$nz_{11}=0$
$nz_{12}=0$
$nz_{13}=0$ Note that $t_1$ and $t_2$ are the center thicknesses of the first lens 11 and the second lens 12, respectively.

Moreover, $N_{20}$ is the standard refractive index of the second lens 12.

The structure of the image-pickup optical system is as follows. The distance between an object and the aperture stop 10 is 9000 mm, the distance between the aperture stop 10 and the first lens 11 is 0 mm, the distance between the first lens 11 and the second lens 12 is 12.27 mm, the distance between the second lens 12 and the sensor window 13 is 9.60 mm, and the distance between the sensor window 13 and the imaging plane Simg is 0.95 mm.

The thickness of the sensor window 13 is 1.0 mm, the sensor window 13 is made of Si (silicon), and the refractive index of the sensor window 13 with respect to the wavelength of 10 μm is 3.42.

The focal distance f of the entire optical system is 19 mm, the diameter of the aperture stop 10 is 18.1 mm, and F-number=1.06 and the horizontal angle of view of 23.8 degrees are realized.

Here, the value of second order differential of the refractive index distribution $N_1$ of the first lens 11 with the radius direction position R is represented by the following formula.

$$\frac{\partial^2 N_1}{\partial R^2} = 2 \cdot nr_{12} + 12 \cdot nr_{14} \cdot R^2 + 30 \cdot nr_{15} \cdot R^4 \quad \text{[Math. 6]}$$

Figure 9:
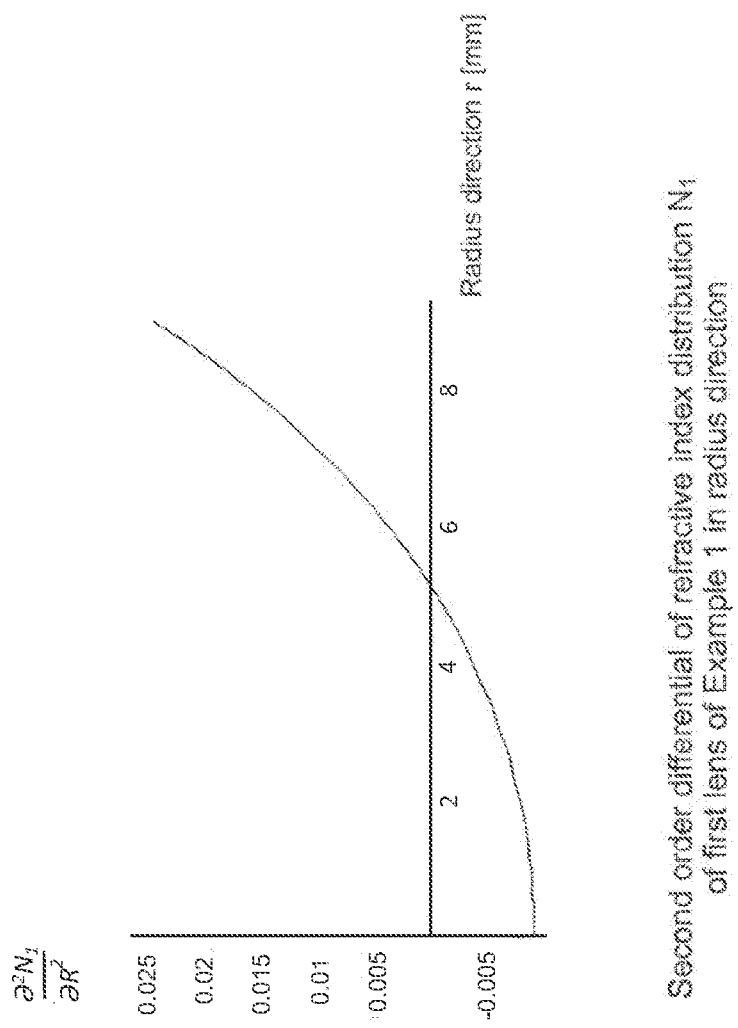
FIG. 9 A graphic diagram showing second order differential of the refractive index distribution of a first lens of Example 1 in the radius direction.

In Example 1, because the values $nr_{14}$ and $nr_{16}$ are positive, as shown in the graph of FIG. 9, in this case, second order differential of the refractive index distribution $N_1$ in the radius direction increases monotonically (increase monotonically with respect to increase in R).

Moreover, the focal distance $f_2$ of the second lens 12 alone is obtained based on the following formula, which is derived from the formula of the focal distance of a GRIN lens, where $nr_{22}$ is negative.

$$f_2 = \frac{1}{\sqrt{|2 \cdot N_{20} \cdot nr_{22}|} \cdot \sin\left(t_2 \cdot \left|\frac{2 \cdot nr_{22}}{N_{20}}\right|^{1/2}\right)} \quad \text{[Math. 7]}$$

The focal distance $f_2$ of Example 1 is calculated based on [Math. 7] and based on the coefficient $nr_{22}=-0.0014226$ set for the second lens 12 in this case, and is 19.0. As a result, $f_2/f=1.0$ is established, and the above-mentioned condition "$0.9 \leq f_2/f \leq 1.1$" is satisfied. In other words, it means that aberration (comatic aberration and astigmatic aberration) is reduced in this structure.

Figure 10:
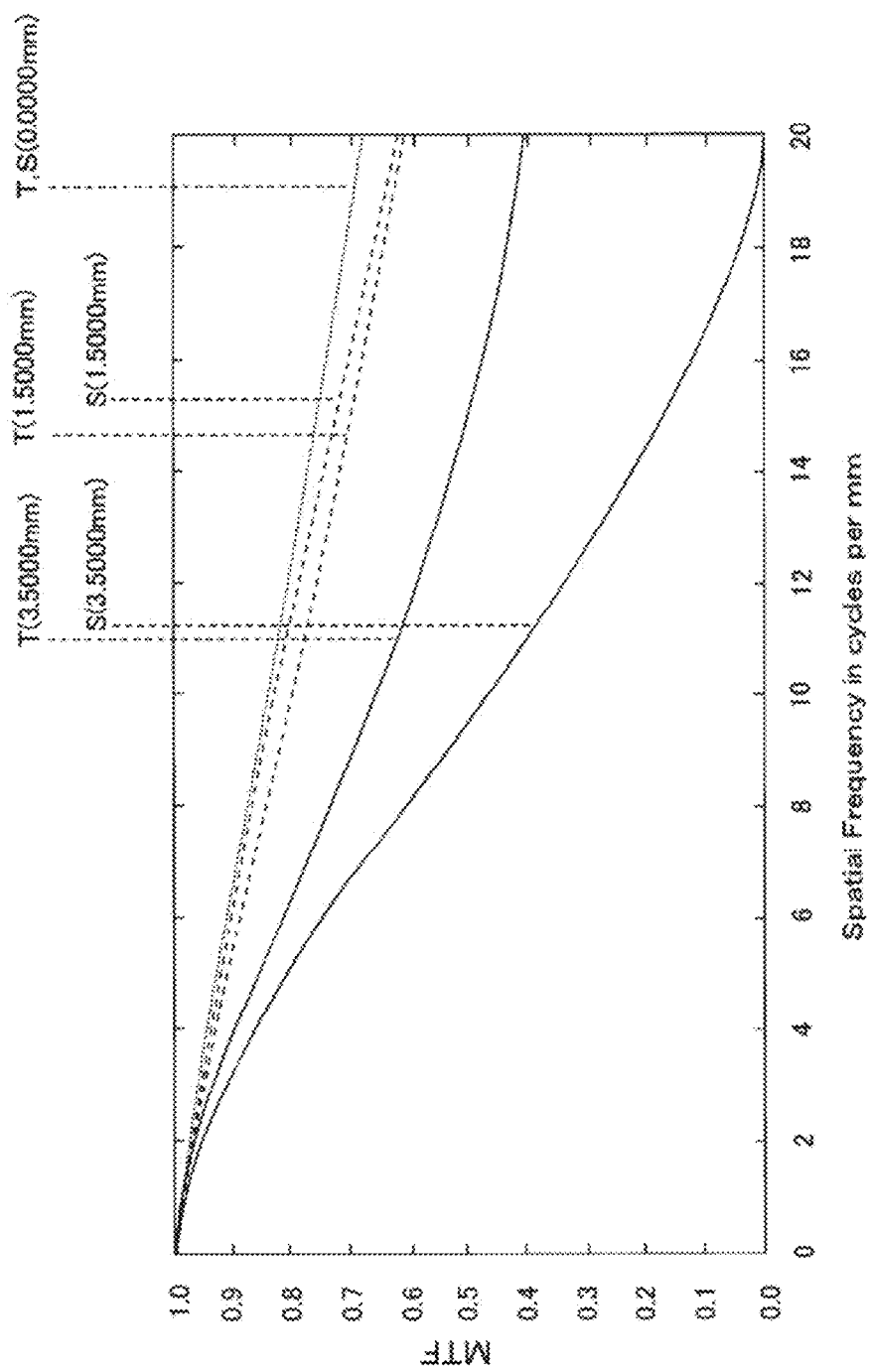
FIG. 10 A diagram showing resolution properties (MTFs) of the image-pickup optical system of Example 1 at the respective image heights (0.0 mm, 1.5 mm, and 3.5 mm).

FIG. 10 shows resolution properties (MTFs) of the image-pickup optical system of Example 1 at the respective image heights (0.0 mm, 1.5 mm, and 3.5 mm).

Note that in FIG. 10 and in addition the following MTF diagrams (FIGS. 13, 18, 21, and 24), commonly, the extremely-short-dashed lines in those figures show the properties at the image height 0.0 mm, the short-dashed lines show the properties at the image height 1.5 mm, and the solid lines show the properties at the image height 3.5 mm. Moreover, in those figures, "T" means tangential values, and "S" means sagittal values.

Here, it is desirable that the MTF value of 20 line pairs/mm at the image height 0.0 mm, i.e., 0%, should be 0.3 or more, that the MTF value of 20 line pairs/mm at the image height 1.5 mm, i.e., 30%, should be 0.3 or more, and that the MTF value of 10 line pairs/mm at the image height 3.5 mm, i.e., 70%, should be 0.3 or more, where the image height 5.0 mm is 100%.

In this example, because of the above-mentioned design, high resolution is obtained, in which the MTF values (tangential and sagittal) of 20 line pairs/mm at the image height 0.0 mm are 0.688, the MTF tangential value and sagittal value of 20 line pairs/mm at the image height 1.5 mm are 0.621 and 0.631, and the MTF tangential value and sagittal value of 10 line pairs/mm at the image height 3.5 mm are 0.661 and 0.482.

According to the above-mentioned Example 1, since two GRIN lenses are used, it is possible to reduce various kinds of aberration such as spherical aberration, comatic aberration, and astigmatic aberration, and to obtain a high-resolution image while the number of lenses is reduced.

Moreover, because GRIN lenses are made of metamaterials, it is possible to realize lenses each having a higher-order refractive index distribution and refractive index distributions in the radius direction and the optical-axis direction, and it is possible to structure an optical system having a small F-number and a wide angle of view, further in view of the polarization direction of incident light.

2-2. Example 2

Figure 11:
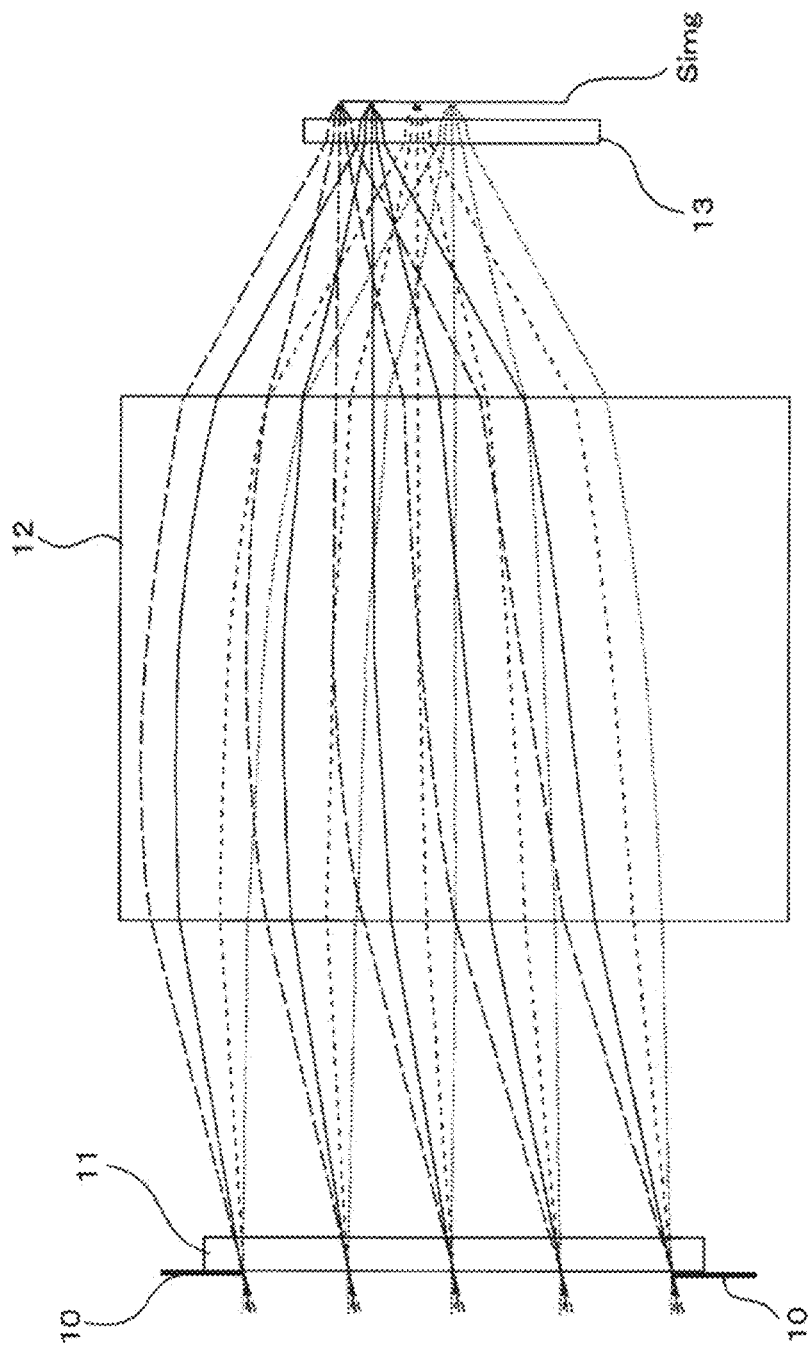
FIG. 11 A diagram showing the structure of an image-pickup optical system of Example 2.

FIG. 11 shows the structure of an image-pickup optical system of Example 2.

Note that similarly FIG. 11 also shows infrared light beams collected at the respective image heights (0.0 mm, 1.5 mm, 3.5 mm, and 5.0 mm). Also in this case, the extremely-short-dashed lines show the image height 0.0 mm, the short-dashed lines show the image height 1.5 mm, the solid lines show the image height 3.5 mm, and the long-dashed lines show the image height 5.0 mm.

Also in the image-pickup optical system of Example 2 shown in FIG. 11, metamaterial lenses are used as both the first lens 11 and the second lens 12.

In Example 2, the first lens 11 has a refractive index distribution only in the radius direction, and the second lens 12 has a refractive index distribution in both the radius direction and the optical-axis direction.

The coefficients of the first lens 11 and the second lens 12 of Example 2 are as follows.

First lens 11
$t_1$: 1.45 mm
$N_{10}=1.5$
$nr_{12}=-0.0026979$
$nr_{14}=8.3000\times10^{-8}$
$nr_{16}=1.3708\times10^{-8}$
$nz_{11}=0$
$nz_{12}=0$
$nz_{13}=0$
Second lens 12
$t_2$: 22.1 mm
$N_{20}=1.7$
$nr_{22}=-0.0012917$
$nr_{24}=6.0592\times10^{-8}$
$nr_{26}=-1.0504\times10^{-10}$
$nz_{11}=0.18715$
$nz_{12}=-0.010492$
$nz_{13}=0.00016204$ Also in Example 2, the distance between an object and the aperture stop 10 is 9000 mm, and the distance between the aperture stop 10 and the first lens 11 is 0 mm. In this case, the distance between the first lens 11 and the second lens 12 is 13.47 mm, the distance between the second lens 12 and the sensor window 13 is 10.54 mm, and the distance between the sensor window 13 and the imaging plane Simg is 0.95 mm.

Also in Example 2, the thickness of the sensor window 13 is 1.0 mm, the sensor window 13 is made of Si, and the refractive index of the sensor window 13 with respect to the wavelength of 10 μm is 3.42.

Also in this case, the focal distance f of the entire optical system is 19 mm, the diameter of the aperture stop 10 is 18.1 mm, and F-number=1.06 and the horizontal angle of view of 23.8 degrees are realized.

Also according to the optical system of Example 2, the value of second order differential of the refractive index distribution $N_1$ of the first lens 11 with the radius direction position R increases monotonically.

Figure 12:
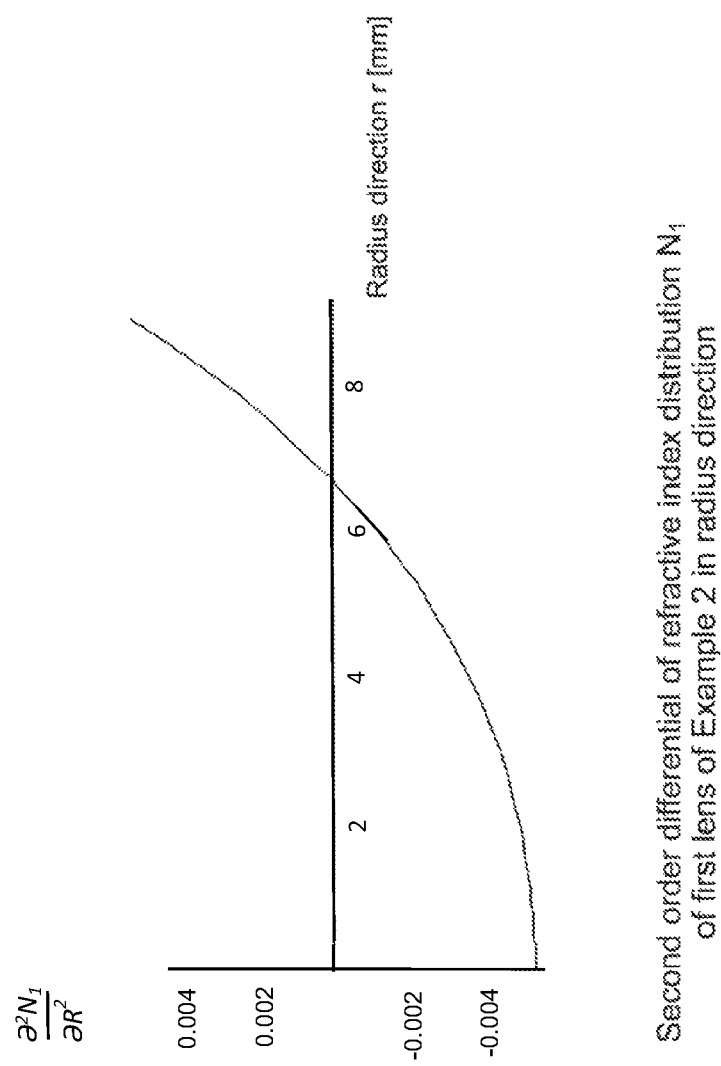
FIG. 12 A graphic diagram showing second order differential of the refractive index distribution of a first lens of Example 2 in the radius direction.

In other words, also in Example 2, because the values $nr_{14}$ and $nr_{16}$ are positive, as shown in the graph of FIG. 12, second order differential of the refractive index distribution $N_1$ of the first lens 11 in the radius direction increases monotonically with respect to increase in R.

Moreover, in Example 2, the focal distance $f_2$ of the second lens 12 alone is calculated based on $nr_{22}=-0.0012917$ set in this case and based on the previous [Math. 7], and is 19.88. As a result, $f_2/f=1.05$ is established.

In other words, also according to the structure in this case, the condition "$0.9\leq f_2/f\leq1.1$" is satisfied, and comatic aberration and astigmatic aberration are reduced.

Figure 13:
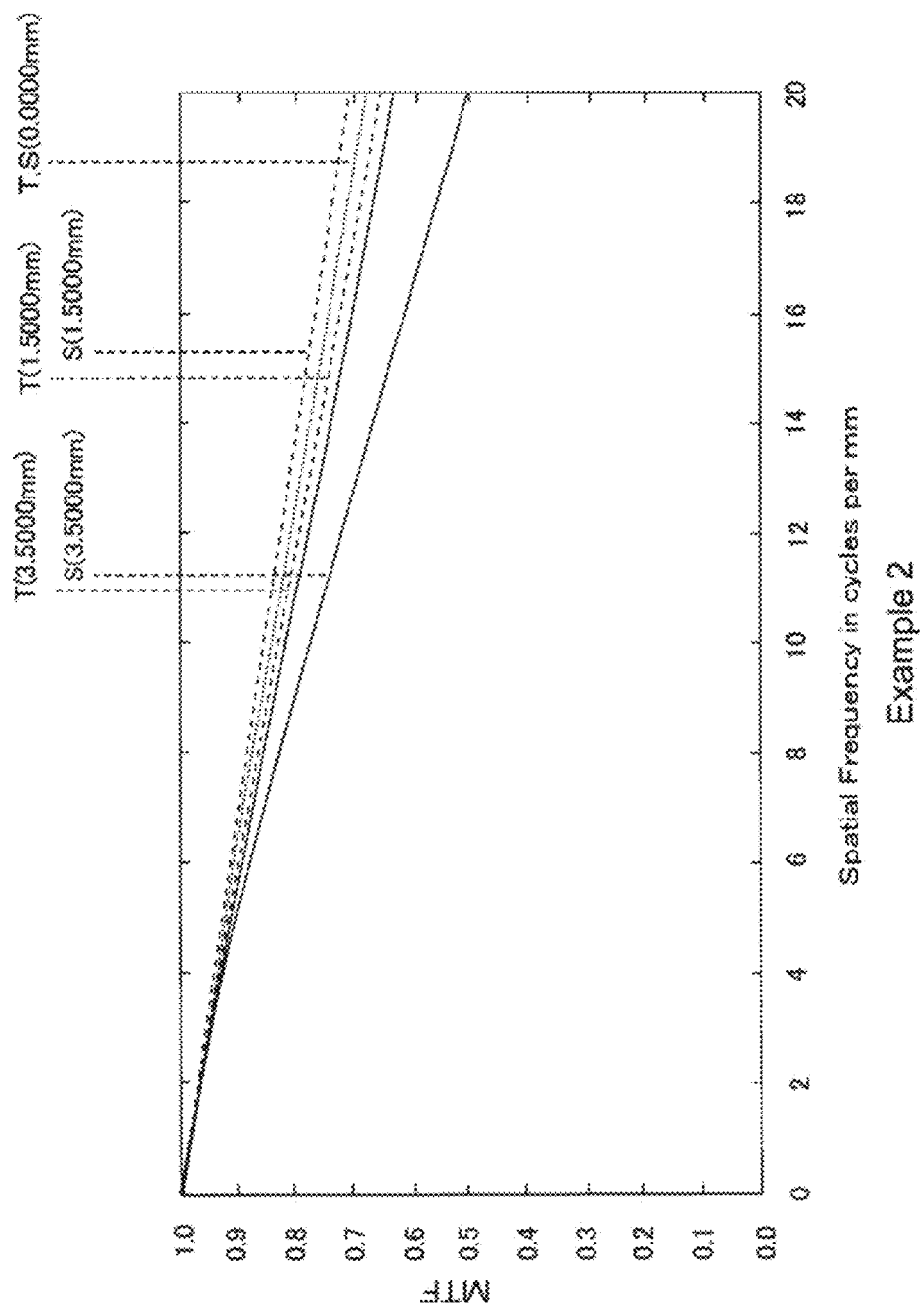
FIG. 13 A diagram showing resolution properties (MTFs) of the image-pickup optical system of Example 2 at the respective image heights (0.0 mm, 1.5 mm, and 3.5 mm).

FIG. 13 shows resolution properties (MTFs) of the image-pickup optical system of Example 2 at the respective image heights (0.0 mm, 1.5 mm, and 3.5 mm).

In Example 2, high resolution is obtained, in which the MTF values (tangential and sagittal) of 20 line pairs/mm at the image height 0.0 mm are 0.687, the MTF tangential value and sagittal value of 20 line pairs/mm at the image height 1.5 mm are 0.664 and 0.715, and the MTF tangential value and sagittal value of 10 line pairs/mm at the image height 3.5 mm are 0.824 and 0.781.

Also according to the above-mentioned Example 2, since two GRIN lenses are used, it is possible to reduce various kinds of aberration such as spherical aberration, comatic aberration, and astigmatic aberration, and to obtain a high-resolution image while the number of lenses is reduced. Moreover, because metamaterial lenses are used as GRIN lenses, it is possible to realize lenses each having a higher-order refractive index distribution and refractive index distributions in the radius direction and the optical-axis direction, and it is possible to structure an optical system having a small F-number and a wide angle of view, further in view of the polarization direction of incident light.

2-3. Example 3

Figure 14:
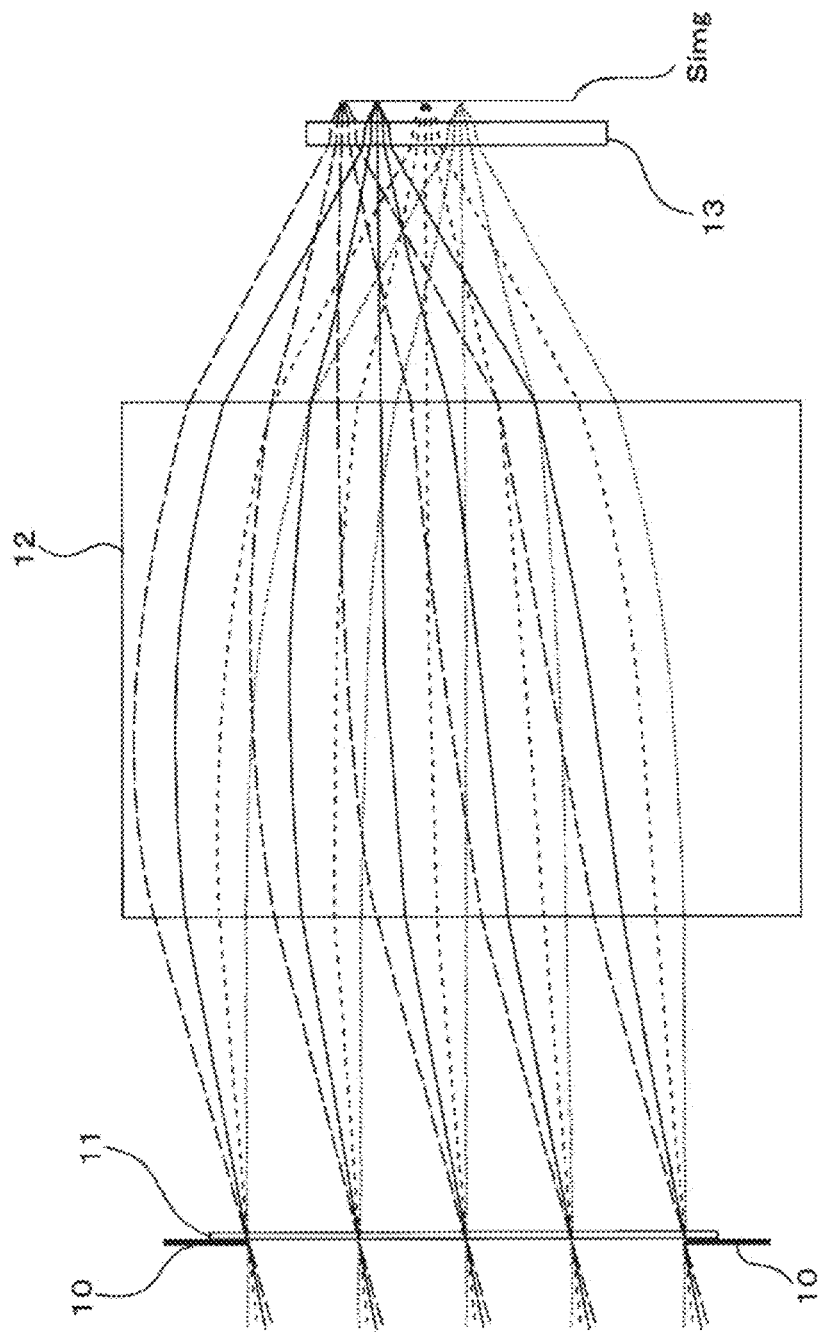
FIG. 14 A diagram showing the structure of an image-pickup optical system of Example 3.

FIG. 14 shows the structure of an image-pickup optical system of Example 3.

Note that similarly FIG. 13 also shows infrared light beams collected at the respective image heights (0.0 mm, 1.5 mm, 3.5 mm, and 5.0 mm). Also in this case, the extremely-short-dashed lines show the image height 0.0 mm, the short-dashed lines show the image height 1.5 mm, the solid lines show the image height 3.5 mm, and the long-dashed lines show the image height 5.0 mm.

Also in the image-pickup optical system of Example 3 shown in FIG. 14, metamaterial lenses are used as both the first lens 11 and the second lens 12. In Example 3, both the first lens 11 and the second lens 12 have refractive index distributions in both the radius direction and the optical-axis direction.

The coefficients of the first lens 11 and the second lens 12 of Example 3 are as follows.

First lens 11
$t_1$: 0.32 mm
$N_{10}=1.5$
$nr_{12}=-0.0084099$
$nr_{14}=4.5915\times10^{-5}$
$nr_{16}=2.3249\times10^{-8}$
$nz_{11}=11.279$
$nz_{12}=54.660$
$nz_{13}=-53.038$
Second lens 12
$t_2$: 21.59 mm
$N_{20}=1.7$
$nr_{22}=-0.0013365$
$nr_{24}=1.0580\times10^{-7}$
$nr_{26}=-2.0880\times10^{-10}$
$nz_{11}=0.16587$
$nz_{12}=-0.011007$
$nz_{13}=0.00013715$ Also in Example 3, the distance between an object and the aperture stop 10 is 9000 mm, and the distance between the aperture stop and the first lens 11 is 0 mm. In this case, the distance between the first lens 11 and the second lens 12 is 13.06 mm, the distance between the second lens 12 and the sensor window 13 is 10.38 mm, and the distance between the sensor window 13 and the imaging plane Simg is 0.95 mm.

Also in this case, the thickness of the sensor window 13 is 1.0 mm, the sensor window 13 is made of Si, and the refractive index of the sensor window 13 with respect to the wavelength of 10 μm is 3.42.

Also in this example, the focal distance f of the entire optical system is 19 mm, the diameter of the aperture stop 10 is 18.1 mm, and F-number=1.06 and the horizontal angle of view of 23.8 degrees are realized.

Also according to Example 3, the value of second order differential of the refractive index distribution $N_1$ of the first lens 11 with the radius direction position R increases monotonically.

Figure 15:
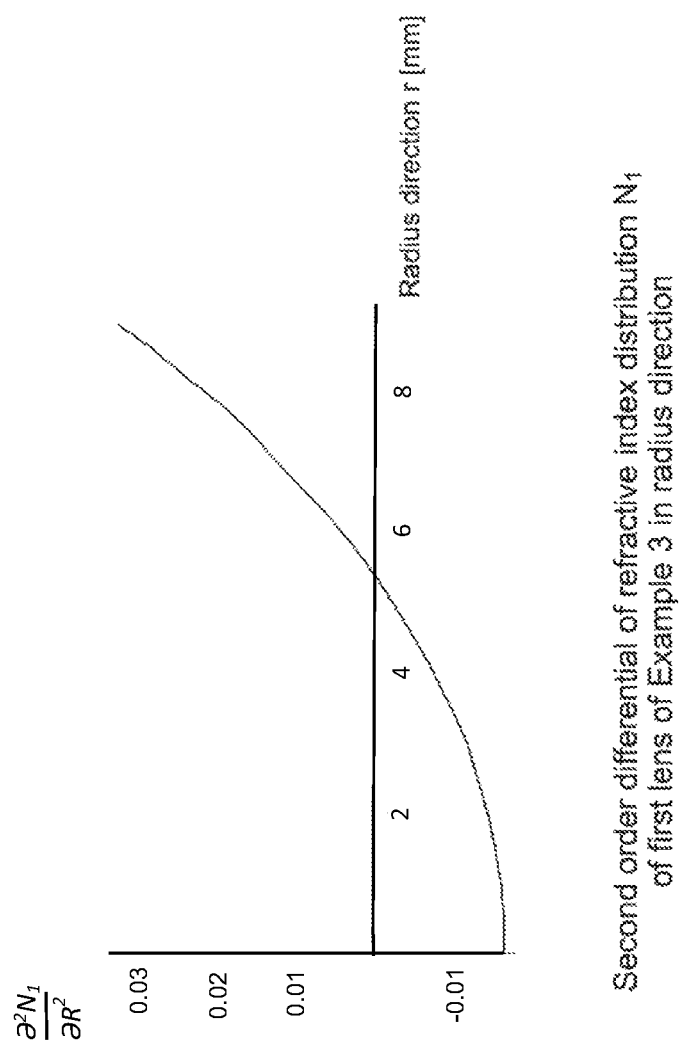
FIG. 15 A graphic diagram showing second order differential of the refractive index distribution of a first lens of Example 3 in the radius direction.

In other words, also in this case, because the values $nr_{14}$ and $nr_{16}$ are positive, as shown in the graph of FIG. 15, second order differential of the refractive index distribution $N_1$ in the radius direction increases monotonically with respect to increase in R.

Moreover, in Example 3, the focal distance $f_2$ of the second lens 12 alone is calculated based on $nr_{22}=-0.0013365$ and based on the previous [Math. 7], and is 19.64. As a result, $f_2/f=1.03$ is established.

In other words, also in this case, "$0.9 \leq f_2/f_{1.1}$" is satisfied, and comatic aberration and astigmatic aberration are reduced.

Here, in Example 3, both the first lens 11 and the second lens 12 have refractive index distributions in both the radius direction and the optical-axis direction.

Second order differential of the refractive index distribution $N_1$ of the first lens 11 at a position Z in the optical-axis direction is as follows.

$$\frac{\partial^2 N_1}{\partial Z^2} = 2 \cdot nz_{12} + 6 \cdot nz_{13} \cdot Z \qquad \text{[Math. 8]}$$

Figure 16:
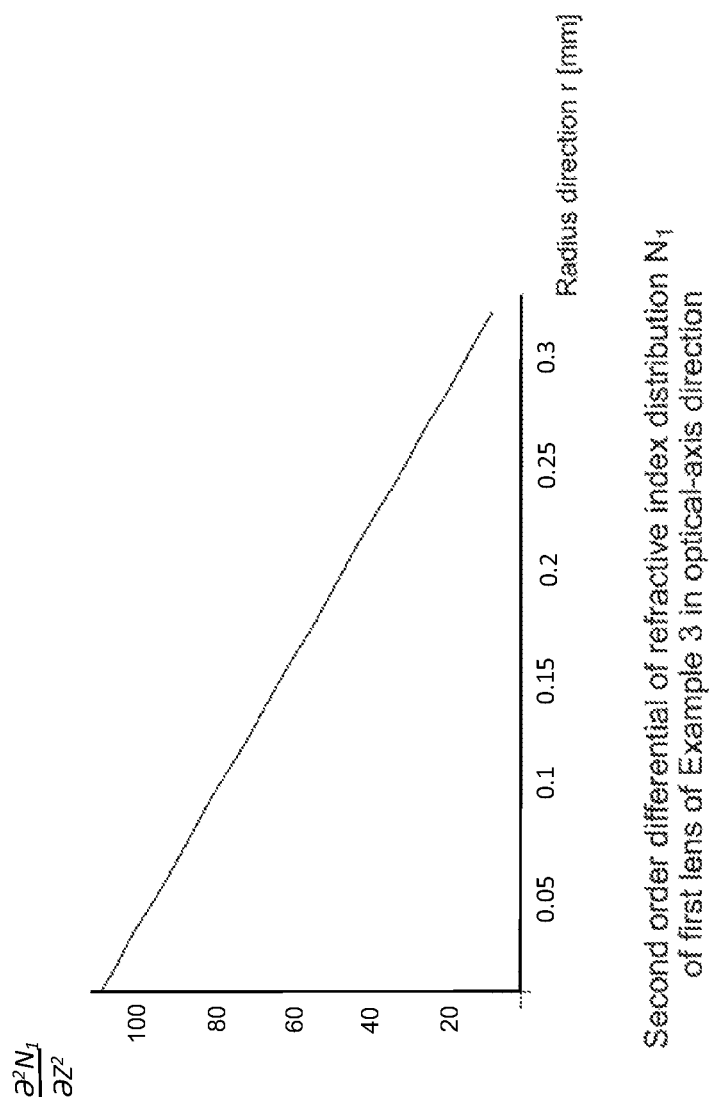
FIG. 16 A graphic diagram showing second order differential of the refractive index distribution of a first lens of Example 3 in the optical-axis direction.

FIG. 16 shows the graph of the above-mentioned [Math. 8]. As shown in FIG. 16, [Math. 8] is always positive within the range Z=0 to 0.32 mm of the thickness of the first lens 11.

Meanwhile, second order differential of the refractive index distribution $N_2$ of the second lens 12 at the position Z in the optical-axis direction is as follows.

$$\frac{\partial^2 N_2}{\partial Z^2} = 2 \cdot nz_{22} + 6 \cdot nz_{23} \cdot Z \qquad \text{[Math. 9]}$$

Figure 17:
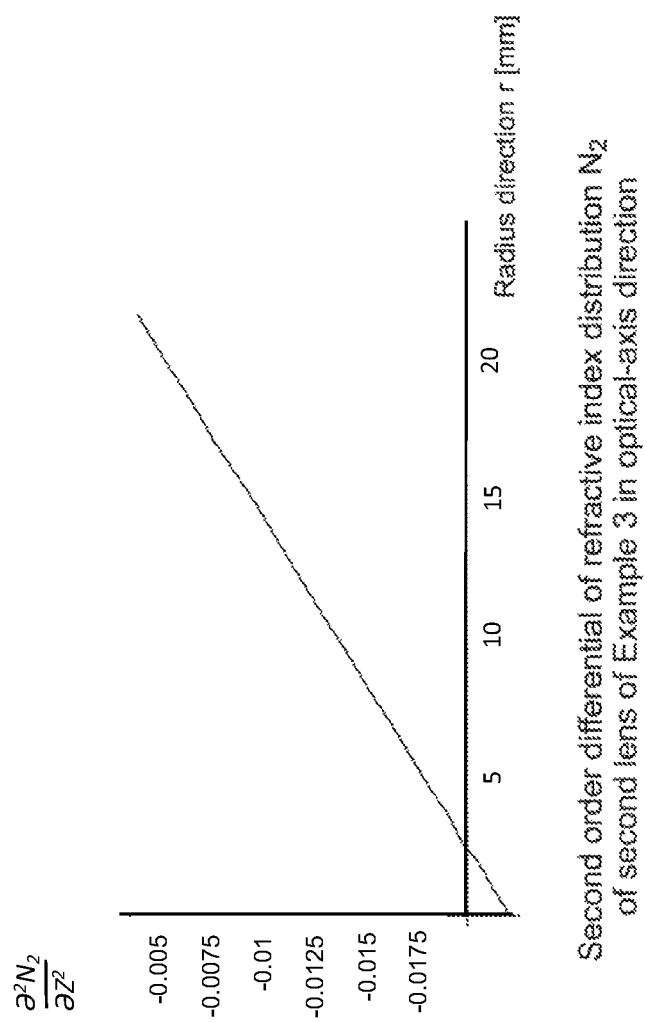
FIG. 17 A graphic diagram showing second order differential of the refractive index distribution of a second lens of Example 3 in the optical-axis direction.

FIG. 17 shows the graph of the above-mentioned [Math. 9]. As shown in FIG. 17, [Math. 9] is always negative within the range Z=0 to 21.59 mm of the thickness of the second lens 12.

As a result, the above-mentioned [Math. 8] is positive where $z=t_1/2$, and the above-mentioned [Math. 9] is negative where $z=t_2/2$.

In other words, in Example 3, the above-mentioned condition "the relation of second order differential of the refractive index distribution $N_1$ of the first lens 11 in the optical-axis direction and second order differential of the refractive index distribution $N_2$ of the second lens 12 in the optical-axis direction is positive/negative" is satisfied.

Figure 18:
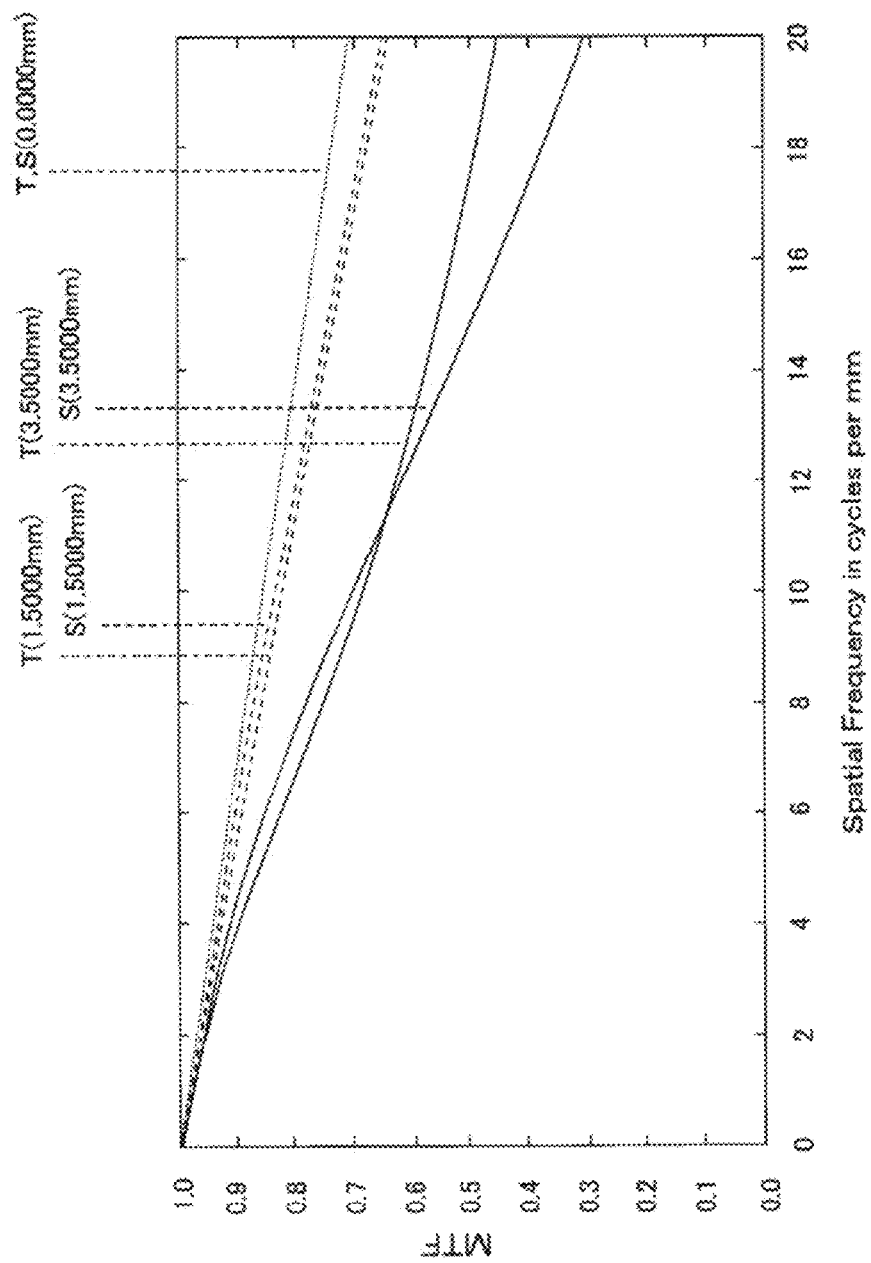
FIG. 18 A diagram showing resolution properties (MTFs) of the image-pickup optical system of Example 3 at the respective image heights (0.0 mm, 1.5 mm, and 3.5 mm).

FIG. 18 shows resolution properties (MTFs) of the image-pickup optical system of Example 3 at the respective image heights (0.0 mm, 1.5 mm, and 3.5 mm).

In Example 3, high resolution is obtained, in which the MTF values (tangential and sagittal) of 20 line pairs/mm at the image height 0.0 mm are 0.718, the MTF tangential value and sagittal value of 20 line pairs/mm at the image height 1.5 mm are 0.655 and 0.658, and the MTF tangential value and sagittal value of 10 line pairs/mm at the image height 3.5 mm are 0.692 and 0.707.

Also according to Example 3, since two GRIN lenses are used, it is possible to reduce various kinds of aberration such as spherical aberration, comatic aberration, and astigmatic aberration, and to obtain a high-resolution image while the number of lenses is reduced. Moreover, because metamaterial lenses are used as GRIN lenses, it is possible to realize lenses each having a higher-order refractive index distribution and refractive index distributions in the radius direction and the optical-axis direction, and it is possible to structure an optical system having a small F-number and a wide angle of view, further in view of the polarization direction of incident light.

2-4. Example 4

Figure 19:
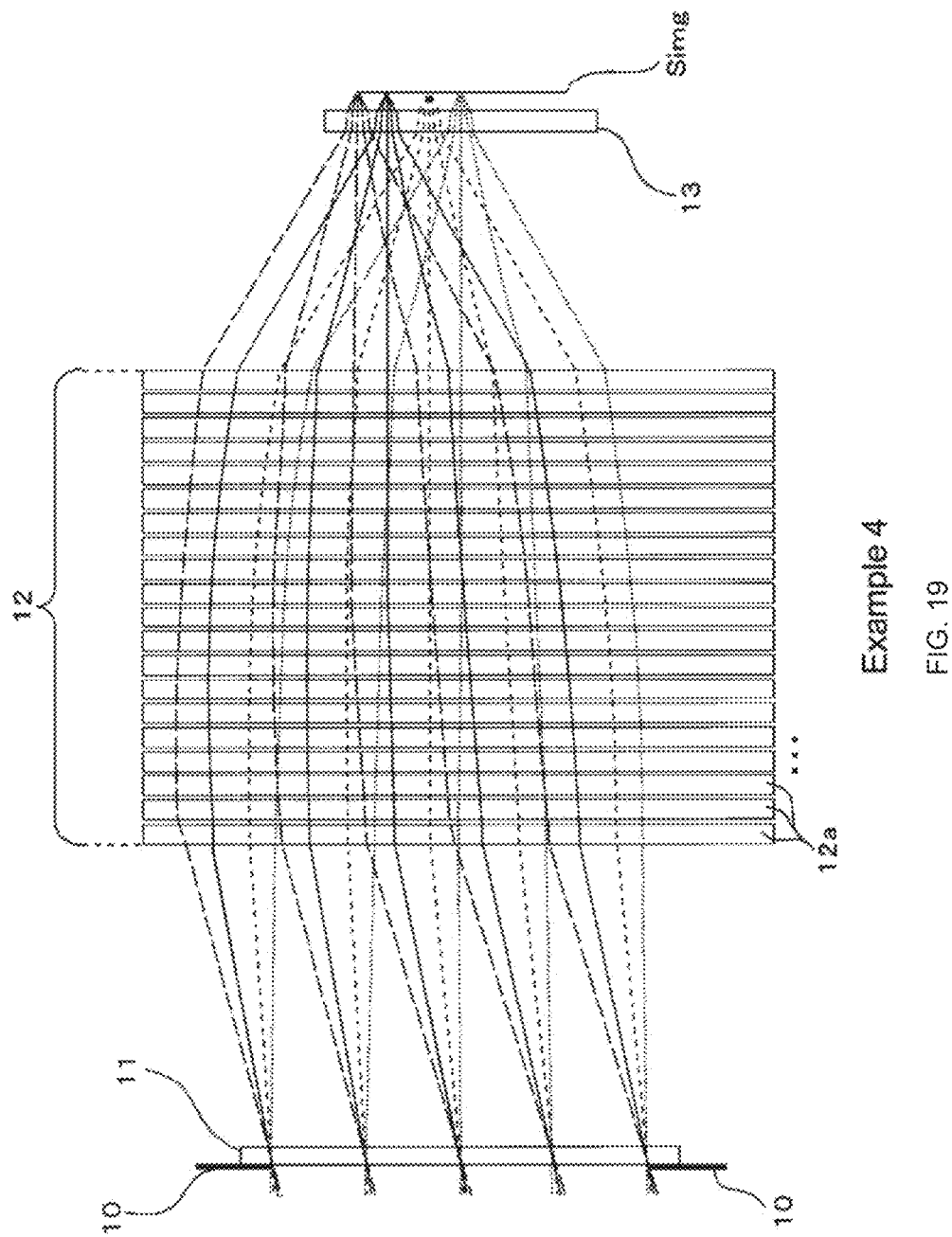
FIG. 19 A diagram showing the structure of an image-pickup optical system of Example 4.

FIG. 19 shows the structure of an image-pickup optical system of Example 4.

Note that similarly FIG. 19 also shows infrared light beams collected at the respective image heights (0.0 mm, 1.5 mm, 3.5 mm, and 5.0 mm). Also in this case, the extremely-short-dashed lines show the image height 0.0 mm, the short-dashed lines show the image height 1.5 mm, the solid lines show the image height 3.5 mm, and the long-dashed lines show the image height 5.0 mm.

Also in the image-pickup optical system of Example 4, metamaterial lenses are used as both the first lens 11 and the second lens 12.

As shown in the figure, in Example 4, the second lens 12 consists of a plurality of metamaterial lenses 12a.

Specifically, in this case, twenty metamaterial lenses 12a are arrayed in the optical-axis direction at regular intervals, whereby the second lens 12 is structured. In this example, the interval between the metamaterial lenses 12a is 0.2 mm.

In Example 4, similar to the above-mentioned Example 2, both the first lens 11 and the second lens 12 have refractive index distributions in the radius direction, and only the second lens 12 has a refractive index distribution in the optical-axis direction.

The coefficients of the first lens 11 and the second lens 12 of Example 4 are as follows.

First lens 11
$t_1$: 1.0 mm
$N_{10}=1.5$
$nr_{12}=-0.0030892$
$nr_{14}=1.4311 \times 10^{-8}$
$nr_{16}=1.7893 \times 10^{-8}$
$nz_{11}=0.0$
$nz_{12}=0.0$
$nz_{13}=0.0$
Each metamaterial lens 12a of second lens 12
$t_2$: 1.0 mm
$N_{20}=1.7$
$nr_{22}=-0.0014303404$
$nr_{24}=6.8750 \times 10^{-8}$
$nr_{26}=-9.9276 \times 10^{-11}$
$nz_{11}=21.915$
$nz_{12}=-13.609$
$nz_{13}=4.3708$
For confirmation, in this case, the above-mentioned $t_2$ shows the center thickness of one metamaterial lens 12a.

Here, as is understood based on the above-mentioned set values, in this example, the lenses 12a of the second lens 12 are designed in the same manner. Because the lenses are designed in the same manner as described above, the manufacturing efficiency may be increased, and as a result the costs may be reduced.

Further, in this example, the thickness of the first lens 11 is the same as the thickness of each metamaterial lens 12a of the second lens 12, and the thickness of them is 1.0 mm. As a result, if there is employed the above-mentioned method of stacking the unit cell structures to manufacture a metamaterial lens, it is possible to manufacture each lens efficiently.

Also in Example 4, the distance between an object and the aperture stop 10 is 9000 mm, and the distance between the aperture stop 10 and the first lens 11 is 0 mm. In this case, the distance between the first lens 11 and the second lens 12 is 15.22 mm, the distance between the second lens 12 and the sensor window 13 is 11.85 mm, and the distance between the sensor window 13 and the imaging plane Simg is 0.95 mm.

Also in this case, the thickness of the sensor window 13 is 1.0 mm, the sensor window 13 is made of Si, and the refractive index of the sensor window 13 with respect to the wavelength of 10 μm is 3.42.

In this case, the focal distance f of the entire optical system is 18.64 mm, and the diameter of the aperture stop 10 is 17.75 mm.

In Example 4, F-number=1.05 and the horizontal angle of view of 24.2 degrees are realized.

Figure 20:
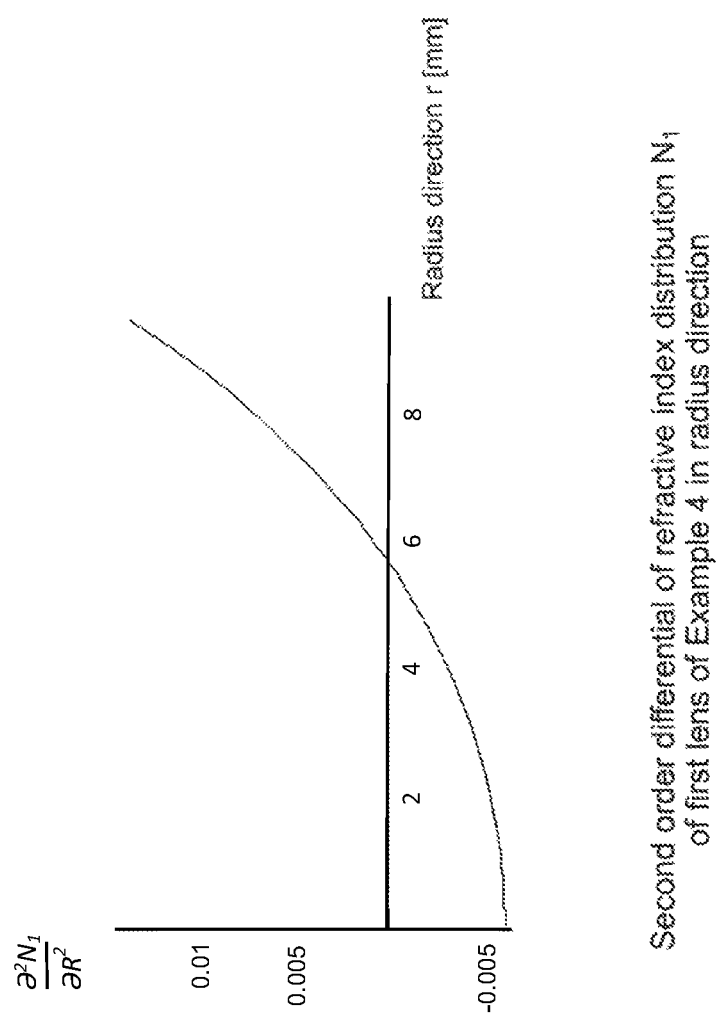
FIG. 20 A graphic diagram showing second order differential of the refractive index distribution of a first lens of Example 4 in the radius direction.

In Example 4, because the values $nr_{14}$ and $nr_{16}$ are positive also in this case, as shown in the graph of FIG. 20, second order differential of the refractive index distribution $N_1$ of the first lens 11 in the radius direction position R increases monotonically with respect to increase in R.

Moreover, in this case, the focal distance $f_2$ of the second lens 12 is 18.60 mm. In this example, because the focal distance f of the entire optical system is 18.64 mm, $f_2/f=0.998$ is established.

In other words, also according to the structure in this case, the condition "$0.9 \leq f_2/f \leq 1.1$" is satisfied, and comatic aberration and astigmatic aberration are reduced.

Figure 21:
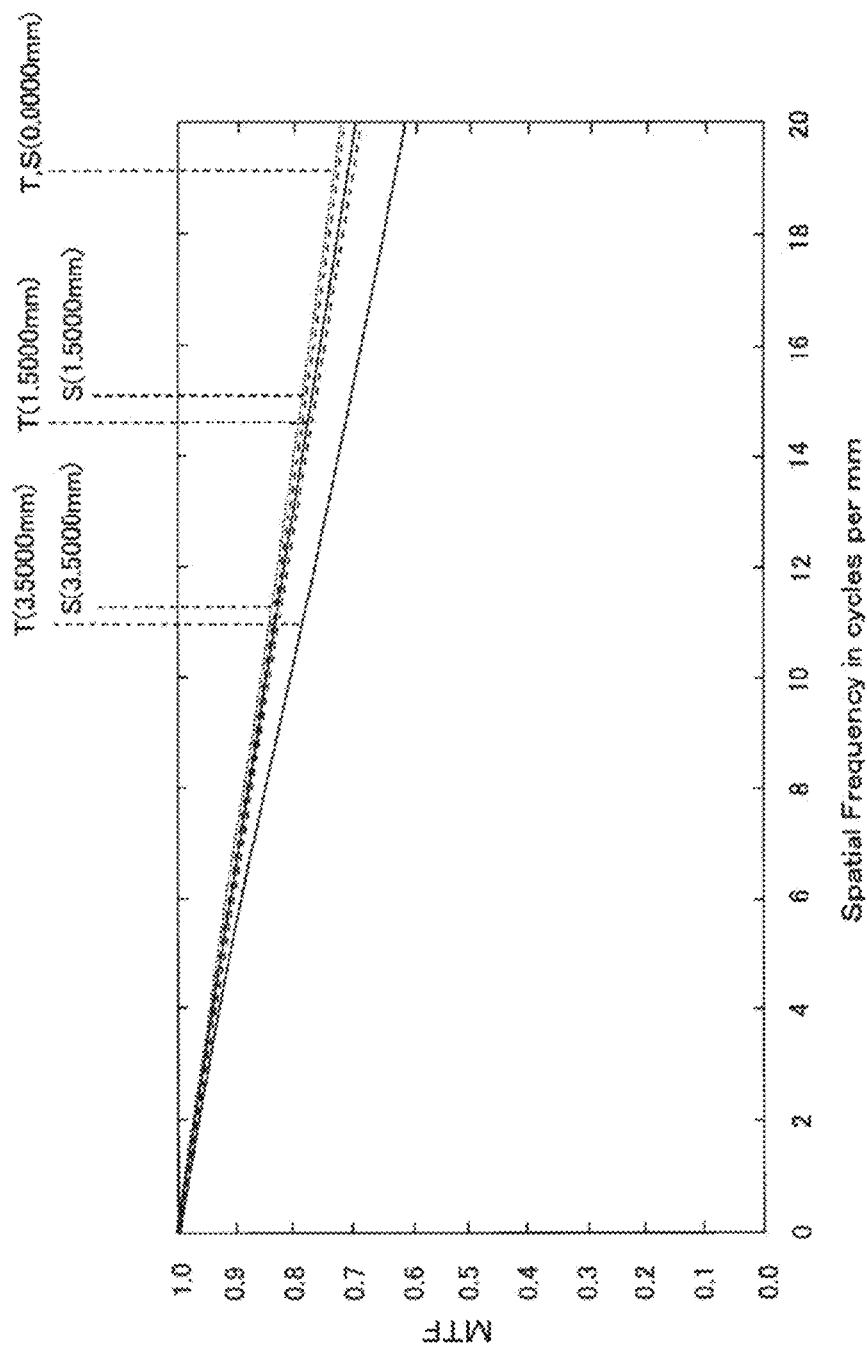
FIG. 21 A diagram showing resolution properties (MTFs) of the image-pickup optical system of Example 4 at the respective image heights (0.0 mm, 1.5 mm, and 3.5 mm).

FIG. 21 shows resolution properties (MTFs) of the image-pickup optical system of Example 4 at the respective image heights (0.0 mm, 1.5 mm, and 3.5 mm).

In Example 4, high resolution is obtained, in which the MTF values (tangential and sagittal) of 20 line pairs/mm at the image height 0.0 mm are 0.727, the MTF tangential value and sagittal value of 20 line pairs/mm at the image height 1.5 mm are 0.695 and 0.719, and the MTF tangential value and sagittal value of 10 line pairs/mm at the image height 3.5 mm are 0.811 and 0.852.

Also according to Example 4, since GRIN lenses are used, it is possible to reduce various kinds of aberration such as spherical aberration, comatic aberration, and astigmatic aberration, and to obtain a high-resolution image. Moreover, also in this case, because metamaterial lenses are used as GRIN lenses, it is possible to realize lenses each having a higher-order refractive index distribution and refractive index distributions in the radius direction and the optical-axis direction, and it is possible to structure an optical system having a small F-number and a wide angle of view, further in view of the polarization direction of incident light.

Meanwhile, in Example 4, the metamaterial lenses 12a of the second lens 12 may be arranged without intervals.

In this case, it is sometimes difficult to closely-attach the lenses 12a without gaps because of, for example, variations of the flatness of the lenses 12a, or the like. If there are unnecessary gaps between the lenses 12a, optical interference may occur. In view of this, it is desirable to arrange the lenses 12a at predetermined intervals.

Here, if the lenses 12a of the second lens 12 are arranged at predetermined intervals, reflection will occur at the gaps between the lenses 12a because of the difference of the refractive index of the lenses 12a and the refractive index of air. It is desirable that the lenses 12a should be anti-reflective in order to reduce optical loss resulting from such reflection.

For example, a method of forming anti-reflective films on the both surfaces of each metamaterial lens 12a, or the like may be employed.

Alternatively, the structure of the metamaterial lenses 12a may be devised to realize anti-reflection instead of forming anti-reflective films.

Here, the ratio of the electric permittivity and the magnetic permeability of the unit cell 15 of the metamaterial lens 12a is adjusted without changing the product of the electric permittivity and the magnetic permeability, whereby the impedance of the unit cell 15 may be the same as the impedance of the adjacent substance and the refractive index of the unit cell 15 may be different from the refractive index of the adjacent substance at the same time. It is possible to reduce reflection at the interfaces of the metamaterial lenses 12a and air by using such properties.

Specifically, if the unit cell 15 is structured such that the electric permittivity ε is equal to the magnetic permeability μ, the impedance $Z=(\mu/\varepsilon)^{1/2}=1$ is established while the refractive index $n=(\varepsilon\mu)^{1/2}$ is adjusted. It is possible to reduce fresnel reflection at the interfaces of the metamaterial lenses 12a and air.

Note that the first lens 11 may also employ the structure in which the structure of a metamaterial lens itself provides an anti-reflective effect. Moreover, even if the second lens 12 consists of one metamaterial lens as previously described in Example 1 or the like, the metamaterial lens may employ such a structure.

2-5. Example 5

Figure 22:
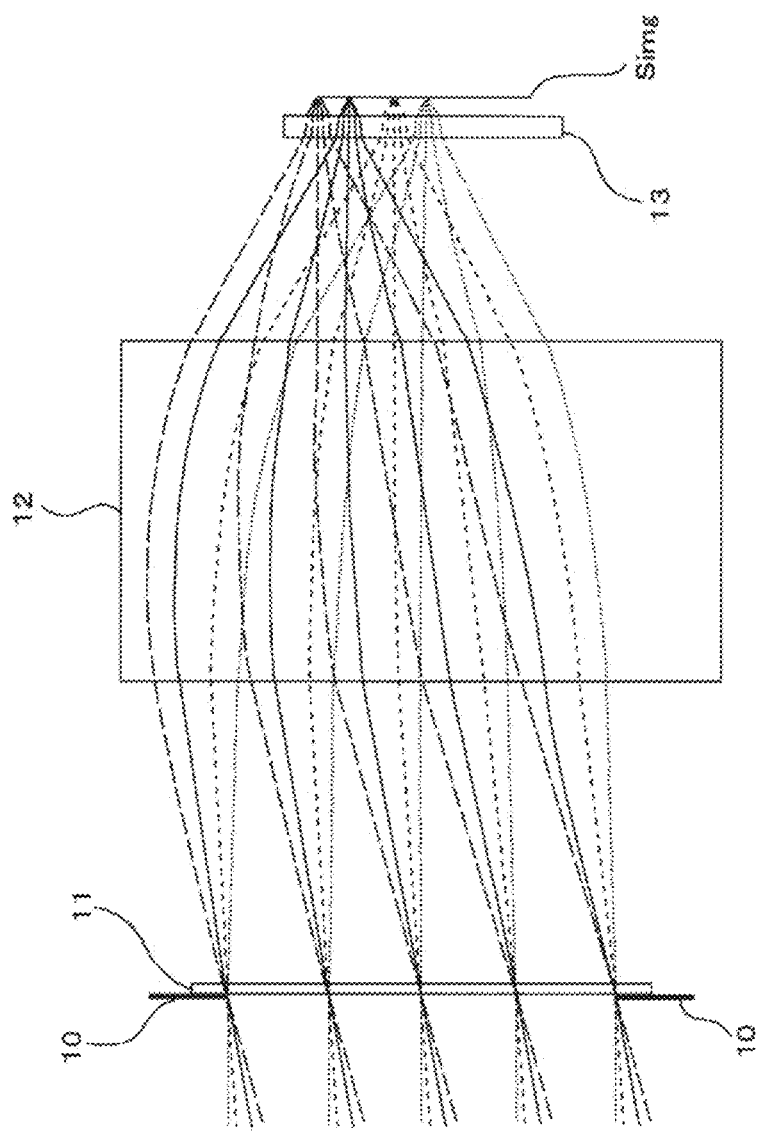
FIG. 22 A diagram showing the structure of an image-pickup optical system of Example 5.

FIG. 22 shows the structure of an image-pickup optical system of Example 5.

Note that similarly FIG. 22 also shows infrared light beams collected at the respective image heights (0.0 mm, 1.5 mm, 3.5 mm, and 5.0 mm). Also in this case, the extremely-short-dashed lines show the image height 0.0 mm, the short-dashed lines show the image height 1.5 mm, the solid lines show the image height 3.5 mm, and the long-dashed lines show the image height 5.0 mm.

As shown in FIG. 22, in the image-pickup optical system of Example 5, similar to the above-mentioned Examples 1 to 3, the first lens 11 consists of one lens and the second lens 12 consists of one lens.

Also in this case, metamaterial lenses are used as both the first lens 11 and the second lens 12.

Moreover, in Example 5, similar to the above-mentioned Example 1, both the first lens 11 and the second lens 12 have refractive index distributions only in the radius direction.

In Example 5, chromatic aberration may be reduced especially based on the following design.

The coefficients of the first lens 11 and the second lens 12 set in Example 5 are as follows.

First lens 11
$t_1$: 0.4 mm
$N_{10}=1.5$
$nr_{12}=-0.011$ $nr_{14}=3.2962\times10^{-5}$
$nr_{16}=4.3911\times10^{-5}$
$nz_{11}=0$
$nz_{12}=0$
$nz_{13}=0$
Second lens 12
$t_2$: 16.07 mm
$N_{20}=1.7$
$nr_{22}=-0.0018027$
$nr_{24}=2.5702\times10^{-7}$
$nr_{26}=-3.7334\times10^{-10}$
$nz_{11}=0$
$nz_{12}=0$
$nz_{13}=0$ Moreover, also in Example 5, the distance between an object and the aperture stop 10 is 9000 mm, and the distance between the aperture stop 10 and the first lens 11 is 0 mm.

In this case, the distance between the first lens 10 and the second lens 12 is 14.2 mm, the distance between the second lens 12 and the sensor window 13 is 9.65 mm, and the distance between the sensor window 13 and the imaging plane Simg is 0.95 mm.

Also in this case, the thickness of the sensor window 13 is 1.0 mm, the sensor window 13 is made of Si, and the refractive index of the sensor window 13 with respect to the wavelength of 10 μm is 3.42.

In this example, the focal distance f of the entire optical system is 19 mm, the diameter of the aperture stop 10 is 18.1 mm, and F-number=1.06 and the horizontal angle of view of 23.8 degrees are realized.

Figure 23:
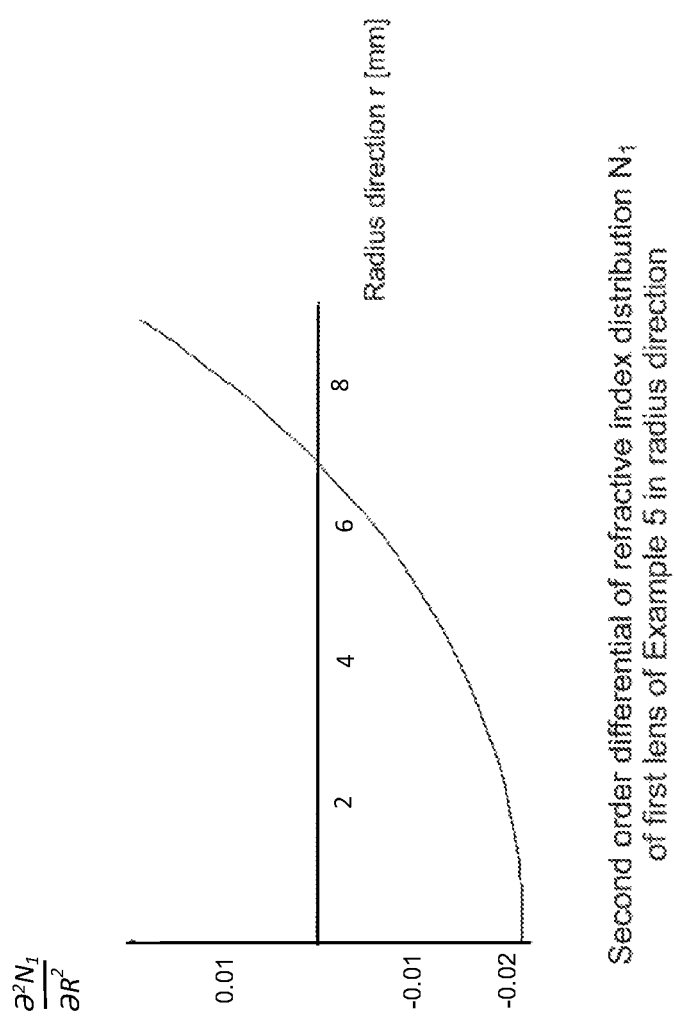
FIG. 23 A graphic diagram showing second order differential of the refractive index distribution of a first lens of Example 5 in the radius direction.

Also according to the optical system of Example 5, the value of second order differential of the refractive index distribution $N_1$ of the first lens 11 with the radius direction position R increases monotonically. In other words, also in Example 5, because the values $nr_{14}$ and $nr_{16}$ are positive, as shown in the graph of FIG. 23, second order differential of the refractive index distribution $N_1$ of the first lens 11 in the radius direction increases monotonically with respect to increase in R.

Figure 24:
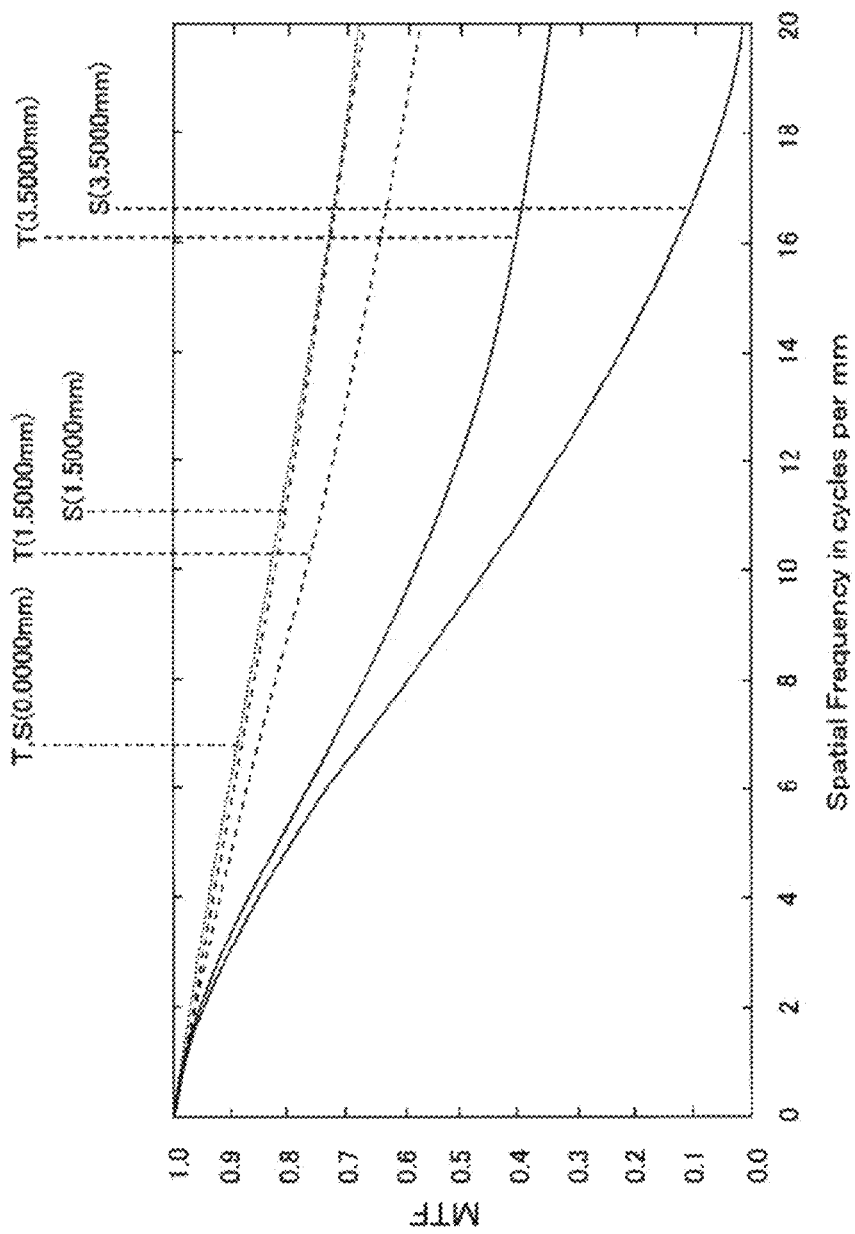
FIG. 24 A diagram showing resolution properties (MTFs) of the image-pickup optical system of Example 5 at the respective image heights (0.0 mm, 1.5 mm, and 3.5 mm).

Moreover, in Example 5, the focal distance $f_2$ of the second lens 12 alone is calculated based on $nr_{22}=-0.0018027$ set in this case and based on the previous [Math. 7], and is 18.94. As a result, in this case, $f_2/f=1.003$ is established, the condition "$0.9\leq f_2/f\leq 1.1$" is satisfied, and comatic aberration and astigmatic aberration are reduced. FIG. 24 shows resolution properties (MTFs) of the image-pickup optical system of Example 5 at the respective image heights (0.0 mm, 1.5 mm, and 3.5 mm).

In Example 5, high resolution is obtained, in which the MTF values (tangential and sagittal) of 20 line pairs/mm at the image height 0.0 mm are 0.676, the MTF tangential value and sagittal value of 20 line pairs/mm at the image height 1.5 mm are 0.583 and 0.667, and the MTF tangential value and sagittal value of 10 line pairs/mm at the image height 3.5 mm are 0.588 and 0.475.

Also according to Example 5, since two GRIN lenses are used, it is possible to reduce various kinds of aberration such as spherical aberration, comatic aberration, and astigmatic aberration, and to obtain a high-resolution image while the number of lenses is reduced.

Moreover, also in this case, because metamaterial lenses are used as GRIN lenses, it is possible to realize lenses each having a higher-order refractive index distribution and refractive index distributions in the radius direction and the optical-axis direction, and it is possible to structure an optical system having a small F-number and a wide angle of view, further in view of the polarization direction of incident light.

Here, according to the above-mentioned Examples, as described above, because the focal distance $f_2$ of the second lens 12 satisfies the condition "$0.9\leq f_2/f\leq 1.1$", the coefficient $nr_{12}$, which determines the light-collecting power of the first lens 11, is approximately 0.

However, if the coefficient $nr_{12}$ is smaller than 0, chromatic aberration may be reduced.

It is known that it is desirable that a material having smaller chromatic dispersion should be used to reduce chromatic aberration. Let's assume a case where a metamaterial substance having refractive index change characteristics previously shown in FIG. 7 is used, such as for example metamaterial lenses used in Examples.

In FIG. 7, in the metamaterial substance, a structural portion, which has a refractive index of 1.5 with respect to a wavelength of 10 μm, has a refractive index of 1.4701 with respect to a wavelength of 12 μm. Moreover, a structural portion, which has a refractive index of 1.7 with respect to a wavelength of 10 μm, has a refractive index of 1.6599 with respect to a wavelength of 12 μm.

At this time, in Example 1 where $nr_{12}$ is −0.0045619, the chromatic aberration is 0.88 mm. Meanwhile, in Example 5 where $nr_{12}$ is −0.011, the chromatic aberration is 0.82 mm, and the chromatic aberration is improved.

It is understood from the above that design, with which chromatic aberration is reduced, may be enabled by using a material or a metamaterial substance having a smaller chromatic dispersion to obtain $nr_{12}$ smaller than 0.

Note that, with only regard to $nr_{12}$, it is necessary to at least satisfy "$nr_{12}<0$" to obtain an effect of reducing chromatic aberration.

3. Modification Examples

The image-pickup optical system and the image pickup apparatus of the embodiment of the present technology have been described. The present technology is not limited to the above-mentioned specific examples.

For example, in the illustrated Examples, the present technology is used to pick up infrared images (wavelength of about 8 μm to 12 μm). Alternatively, the present technology may be used to pick up terahertz-wave images.

A terahertz-wave image-pickup optical system may have a structure in which for example an object-of-imaging is irradiated with laser light, a terahertz wave is thus generated, and the generated terahertz wave enters via the aperture stop 10. The structures of the aperture stop 10 and thereafter may be similar to the above-mentioned structure. Further, a sensor sensitive to terahertz waves may be used as the image sensor 3.

Moreover, in the above illustration, the distance between the aperture stop 10 and the first lens 11 is 0. The first lens 11 may be arranged as close to the aperture stop 10 as possible to improve a spherical-aberration-correction effect.

Moreover, in the above illustration of Example 4, when the second lens 12 consists of the plurality of metamaterial lenses 12a, the lenses 12a have the same design without fail. Alternatively, as a matter of course, it is also possible to use differently-designed lenses, or to combine lenses having one design and lenses having other design. Moreover, the present technology may employ the following structures.

(1) An image-pickup optical system, comprising:
a first lens provided near an aperture stop and configured to correct aberration; and a second lens arranged between the first lens and an image sensor and configured to collect light, wherein the first lens is a gradient index lens.

(2) The image-pickup optical system according to (1), wherein a focal distance of the second lens is approximately the same as a focal distance of the entire image-pickup optical system.

(3) The image-pickup optical system according to (2), wherein the first lens is designed such that second order differential of a refractive index distribution of the first lens in a radius direction increases monotonically.

(4) The image-pickup optical system according to (3), wherein the second lens is a gradient index lens.

(5) The image-pickup optical system according to (4), wherein the first lens or the second lens has a refractive index distribution in an optical-axis direction.

(6) The image-pickup optical system according to (4), wherein both the first lens and the second lens have refractive index distributions in an optical-axis direction, and are designed such that the relation of second order differential of the refractive index distribution of the first lens in the optical-axis direction and second order differential of the refractive index distribution of the second lens in the optical-axis direction is positive/negative.

(7) The image-pickup optical system according to any one of (4) to (6), wherein one of the first lens and the second lens is a metamaterial lens.

(8) The image-pickup optical system according to (7), wherein the metamaterial lens is structured such that refractive indexes in arbitrary polarization directions perpendicular to an optical axis are constant at an arbitrary point of the metamaterial lens.

(9) The image-pickup optical system according to (7), wherein the metamaterial lens is structured such that refractive indexes in arbitrary polarization directions are constant at an arbitrary point of the metamaterial lens.

(10) The image-pickup optical system according to any one of (7) to (9), wherein the second lens consists of a plurality of metamaterial lenses.

(11) The image-pickup optical system according to (10), wherein the metamaterial lenses of the second lens are arrayed at predetermined intervals.

(12) The image-pickup optical system according to any one of (1) to (11), wherein $$N=N_0+nr_{12}\cdot R^2+nr_{14}\cdot R^4+nr_{16}\cdot R^6+nz_{11}\cdot Z+nz_{11}\cdot Z+nz_{12}\cdot Z^2+nz_{12}\cdot Z^3 \quad \text{[Math. 2]}$$

is established when a refractive index distribution of the first lens is $$0.9 \le \frac{f_2}{f} \le 1.1 \quad \text{[Math. 1]}$$

where r is a radius direction position, z is a position in an optical-axis direction, $N_{10}$ is a standard refractive index of the first lens, $nr_{1j}$ is a coefficient of a term $r^j$ of a refractive index distribution formula, $nz_{1k}$ is a coefficient of a term $z^k$ of the refractive index distribution formula, j is an even number, and k is an integer number.

(13) The image-pickup optical system according to any one of (1) to (12), wherein an infrared image is formed.

(14) The image-pickup optical system according to any one of (1) to (12), wherein a terahertz-wave image is formed.

DESCRIPTION OF SYMBOLS

1 image pickup apparatus
2 optical block
3 image sensor
4 image-signal obtaining unit
5 image signal processor
10 aperture stop
11 first lens
12 second lens
13 sensor window
15 unit cell
16 conductor
Simg imaging plane

The invention claimed is:

1. An image-pickup optical system, comprising:
an image sensor;
an aperture stop;
a first lens adjacent to the aperture stop, wherein the first lens is configured to correct aberration; and
a second lens between the first lens and the image sensor, wherein
both the first lens and the second lens have refractive index distributions in an optical-axis direction,
second order differential of a refractive index distribution of the first lens in the optical-axis direction is positive and second order differential of a refractive index distribution of the second lens in the optical-axis direction is negative, and
a ratio of a focal distance $f_2$ of the second lens to a focal distance f of the image-pickup optical system satisfies the following:

$$0.9 \le f_2/f \le 1.1.$$

2. The image-pickup optical system according to claim 1, wherein the image sensor is configured to collect light.

3. The image-pickup optical system according to claim 1, wherein
the first lens is a gradient index lens.

4. The image-pickup optical system according to claim 3, wherein the second order differential of the refractive index distribution of the first lens increases monotonically in a radius direction of the first lens.

5. The image-pickup optical system according to claim 1, wherein the second lens is a gradient index lens.

6. The image-pickup optical system according to claim 1, wherein one of the first lens or the second lens is a metamaterial lens.

7. The image-pickup optical system according to claim 6, wherein refractive indexes of the metamaterial lens in arbitrary polarization directions perpendicular to an optical axis are constant at an arbitrary point of the metamaterial lens.

8. The image-pickup optical system according to claim 6, wherein refractive indexes of the metamaterial lens in arbitrary polarization directions are constant at an arbitrary point of the metamaterial lens.

9. The image-pickup optical system according to claim 8, wherein the second lens consists of a plurality of metamaterial lenses.

10. The image-pickup optical system according to claim 8, wherein a plurality of metamaterial lenses of the second lens is arrayed at specific intervals.

11. The image-pickup optical system according to claim 1, wherein
the first lens is a gradient index lens, and
the refractive index distribution N of the first lens is equal to:
$(N=N_0+nr_{12} R_2+nr_{14} R_4+nr_{16} R_6+nz_{11} Z+nz_{12} Z_2+nz_{13} Z_3)$ where $N_0$ is a standard refractive index of the gradient index lens, Z is a position of the gradient index lens in the optical-axis direction, R is a position of the gradient index lens in a radius direction of the gradient index lens, $nr_{1j}$ is a coefficient of a term $R_j$ of a refractive index distribution formula, $nz_{1k}$ is a coefficient of a term $Z_k$ of the refractive index distribution formula, j is an even number, and k is an integer number.

12. The image-pickup optical system according to claim 1, wherein the image-pickup optical system is configured to generate an infrared image.

13. The image-pickup optical system according to claim 1, wherein the image-pickup optical system is configured to generate a terahertz-wave image.

14. An image-pickup optical system, comprising:
an image sensor;
an aperture stop;
a first lens adjacent to the aperture stop, wherein
  the first lens is configured to correct aberration,
  the first lens is a gradient index lens, and
  second order differential of a refractive index distribution of the first lens increases monotonically in a radius direction of the first lens; and
a second lens between the first lens and the image sensor, wherein
  a ratio of a focal distance $f_2$ of the second lens to a focal distance f of the image-pickup optical system satisfies the following:
  $0.9 \le f_2/f \le 1.1$.

15. An image-pickup optical system, comprising:
an image sensor;
an aperture stop;
a first lens adjacent to the aperture stop, wherein the first lens is configured to correct aberration; and
a second lens between the first lens and the image sensor, wherein
  one of the first lens or the second lens is a metamaterial lens,
  refractive indexes of the metamaterial lens in arbitrary polarization directions are constant at an arbitrary point of the metamaterial lens, and
  a ratio of a focal distance $f_2$ of the second lens to a focal distance f of the image-pickup optical system satisfies the following:
  $0.9 \le f_2/f \le 1.1$.

* * * * *